US011961174B2

United States Patent
Fessler, Jr. et al.

(10) Patent No.: US 11,961,174 B2
(45) Date of Patent: Apr. 16, 2024

(54) PROGRAMMATICALLY CONFIGURING MATERIALS

(71) Applicant: Manticore Games, Inc., San Mateo, CA (US)

(72) Inventors: Daniel Fessler, Jr., San Mateo, CA (US); Brendan Mauro, San Mateo, CA (US); Alexandra Baryshnikova, San Mateo, CA (US)

(73) Assignee: Manticore Games, Inc., San Mateo, CA (US)

(*) Notice: Subject to any disclaimer, the term of this patent is extended or adjusted under 35 U.S.C. 154(b) by 0 days.

(21) Appl. No.: 17/847,957

(22) Filed: Jun. 23, 2022

(65) Prior Publication Data

US 2023/0012480 A1 Jan. 19, 2023

Related U.S. Application Data

(63) Continuation of application No. 17/322,678, filed on May 17, 2021, now Pat. No. 11,398,071, which is a continuation of application No. 17/095,621, filed on Nov. 11, 2020, now Pat. No. 11,043,021.

(60) Provisional application No. 62/933,821, filed on Nov. 11, 2019.

(51) Int. Cl.
*G06T 15/04* (2011.01)
*A63F 13/35* (2014.01)
(Continued)

(52) U.S. Cl.
CPC .............. *G06T 15/04* (2013.01); *A63F 13/35* (2014.09); *A63F 13/53* (2014.09); *A63F 13/63* (2014.09);
(Continued)

(58) Field of Classification Search
CPC ....... G06T 15/04; G06T 11/001; G06T 17/20; G06T 11/40; A63F 13/63; A63F 13/847; A63F 13/35; A63F 13/53
See application file for complete search history.

(56) References Cited

U.S. PATENT DOCUMENTS

2006/0258447 A1* 11/2006 Baszucki ............... A63F 13/12
463/31
2015/0325044 A1 11/2015 Lebovitz

OTHER PUBLICATIONS

Everitt, Cass. "Projective texture mapping." White paper, Nvidia Corporation 4.3 (2001). (Year: 2001).*

(Continued)

*Primary Examiner* — Daniel F Hajnik
(74) *Attorney, Agent, or Firm* — Pillsbury Winthrop Shaw Pittman, LLP

(57) ABSTRACT

Improved texturing processes utilizing smart materials are provided to increase developer productivity when texturing objects within multi-dimensional environments, and particularly, 3D environments. A developer may generate an object, select a smart material to apply, and manipulate the dimensions of the object to cause an aspect ratio of at least one surface having a material applied to change without altering an aspect ratio of a texture tile of the material as rendered on the surface of the object. Texturing of object surfaces from a selected smart material is determined in a shared material space based on a mapping of object vertices that maintain original material qualities (e.g., a defined aspect ratio of the texture) and mitigate discontinuities in a material applied to adjacent surfaces, including those of different objects and when those objects are repositioned.

20 Claims, 11 Drawing Sheets

(51) Int. Cl.
A63F 13/53 (2014.01)
A63F 13/63 (2014.01)
A63F 13/847 (2014.01)
G06T 11/00 (2006.01)
G06T 11/40 (2006.01)
G06T 17/20 (2006.01)

(52) U.S. Cl.
CPC .......... *A63F 13/847* (2014.09); *G06T 11/001* (2013.01); *G06T 11/40* (2013.01); *G06T 17/20* (2013.01)

(56) References Cited

OTHER PUBLICATIONS

NPL Video Titled "Game level texturing: Projection (PART 4/5)", Gleb Alexandrov, Published Aug. 6, 2014; available for viewing at: https://www.youtube.com/watch?v=PCXnLCncBcA; selected screen shots included. (Year: 2014).*

NPL Video Titled "Texture_Mapping For Absolute Beginners—Blender Tutorial", Published Apr. 8, 2018; available for viewing at: https://www.youtube.com/watch?v=eiDrRa6JvQ0; select screenshots included. (Year: 2018).*

NPL Video Titled "Maya: 3D Projection Textures", published Nov. 21, 2018; available for viewing at: https://www.youtube.com/watch?v=pr39rWyPg_o; select screenshots included. (Year: 2018).*

NPL Video Titled "Maya To Unity Tutorial: How to Import Autodesk Maya Models Into the Unity Game Engine", published Feb. 13, 2012; available for viewing at: https://www.youtube.com/watch?v=yP6Nj3oyS2g; select screenshots included. (Year: 2012).*

Akenine-Moller, Thomas and Eric Haines. "Real-Time Rendering." 2nd ed. (2002), pp. 118-128. (Year: 2002).*

NPL Video Titled "Maya LT/Maya Tip #5: Make Mesh Adjustments Without Moving UVs with Preserve UVs", published Jun. 4, 2018; available for viewing at: https://www.youtube.com/watch?v=QjqzRvgRqs; select screenshots included. (Year: 2018).*

Examination Report for related Canadian Patent Application 3,157,677 dated Jan. 31, 2023, 4 pages.

European Search Report for related European Patent Application 20887615.1 issued Sep. 22, 2023, 7 pages.

* cited by examiner

PROGRAMMATICALLY CONFIGURING MATERIALS

CROSS-REFERENCE TO RELATED APPLICATIONS

The present non-provisional application is a continuation of U.S. application Ser. No. 17/322,678, filed 17 May 2021. U.S. application Ser. No. 17/322,678 is a continuation of U.S. application Ser. No. 17/095,621, filed 11 Nov. 2020, which claims the benefit of U.S. Provisional Application No. 62/933,821, filed 11 Nov. 2019, each of which is incorporated by reference herein in its entirety.

BACKGROUND

1. Field

The present disclosure relates generally to computer-implemented techniques to model geometric objects and, more specifically, to enhancing the development of game materials applied to geometric objects through variable reduction in complex texture processes.

2. Description of the Related Art

Currently, game-development environments, like 3-dimensional (3D) environments in gaming (and other applications) are relatively easy to initialize as a blank canvas. Those environments are typically populated with geometric objects, which may be static, interactive or dynamic, or user playable. An example of a static object may be a tree or a wall in a given position within the environment. Currently, geometric objects are relatively easy to create and manipulate to create geometric elements made up of multiple geometric objects. Example geometric elements might include, for example, a castle, a mountain range, a character model, etc., each of which may be composed of multiple geometric objects. Multiple geometric elements may make up a 3D environment such as a castle with a mountainous backdrop. An example of an interactive or dynamic object may be a door of the castle, which opens and closes either based on preconfigured rules or in response to user interaction. Other examples can include non-playable character models. An example of a user playable object (or element) may be an avatar (e.g., a user playable character model) through which the user explores and interacts with other objects (or elements) within a 3D environment. For example, the user may navigate a 3D environment, like that described above, via an avatar within the environment to explore the castle (e.g., by opening the door and entering the castle) or mountain range (e.g., by opening the door and exiting the castle into a larger space and moving towards the mountain range) and the like.

Initializing such environments and populating them with objects, many of which are preconfigured in various editors, such as 3D blocks or rectangular shapes to define the shape of a wall or tetrahedrons or triangles to define the shape of a mountain range, and the like, is straight-forward and convenient for developers with minimal skills. Those objects, however, must be detailed by the application of textures to give them their character, e.g., texturing a rectangular shape to have a visual appearance as a wall of a castle.

Texturing objects often presents significant challenges to unskilled developers. Texturing applies visual features to objects or shapes, such that a rectangular shape of a building looks like a brick or stone wall or a triangular or tetrahedral shape of a mountain range looks like an actual mountain. In many cases, a texture of an object is an image applied to a surface or surfaces of the object and may repeat to provide surface coverage by tiling of the image on the surface. The process of applying textures to the large number of objects in an environment is time consuming and difficult, with difficulty increasing where a coherent appearance is desired across multiple objects making up an element. As a result, developers—especially solo-developers—interested in developing games spend an inordinate amount of time trying to create visually appealing environments rather than being able to focus their efforts on developing gameplay.

SUMMARY

The following is a non-exhaustive listing of some aspects of the present techniques. These and other aspects are described in the following disclosure.

Some aspects include a process for implementing smart materials, such as with an editor. In some embodiments, the smart materials may be programmatically configured from a texture selected from a standardized set of textures and applied to one or more objects from a standardized set of objects, a resulting set of models defined by model code (which may include smart material instances) by which an application including the standardized set of textures and the standardized set of objects can render the set of models without receiving the resulting set of models. Some examples of a smart material enable a seamless overlap in texture across surfaces of objects in a same plane. Some examples of a smart material enable a seamless junction of texture between surfaces of an object or different objects along an edge. Some examples of a smart material are mapped to an environment space and projected on a surface of an object independent of object scaling and dependent on object position. Some examples of a smart material are mapped to an environment space and projected on co-planer or parallel surfaces of different objects with continuous tiling of a specified sample texture or selected portion of a sample texture. Some examples of a smart material are mapped to an environment space and projected on adjacent surfaces in different planes with continuous tiling of a specified sample texture or selected portion of a sample texture.

Some example embodiments include an editor by which smart materials or materials may be implemented. Some example embodiments include programmatically configuring a smart material from a portion of a same texture tile within an environment spaced based on parameters or settings provided in association with a smart material in the editor. Some examples of an editor include environment parameters to globally scale smart materials (e.g., by scaling of a texture tile utilized by the smart material) and modify pixel density of smart materials (e.g., by down sampling or otherwise adjusting a quality of a texture tile utilized by the smart material) independent of objects. Some examples of an editor include a pane by which smart material instances may be grouped and environment parameters specified for a subset of smart material instances. Some examples of an editor include a pane by which a smart material instance may be selected and applied to an object. Some examples of an editor include a pane by which a portion of a sample texture may be selected to define a texture tile for programmatically configuring a smart material within the environment. Some examples of an editor include a pane by which a tiling direction or directions of a smart material may be selected for a texture tile, the smart material configured to define a projection of the texture tile in the corresponding direction(s) by an adjacent positioning of texture tiles. Some examples of an editor include a pane by which a smart material instance having a specified tile direction may be projected in the corresponding direction based on a position and orientation of a feature (e.g., one or more of an edge, vertex, or orientation vector) of an object. Some examples of an editor include a hold selection to capture a current projection of a smart material (mapped to an environment space) on a surface of an object (based on the mapping) and bind the captured projection to the surface of the object, the captured projection bound to the surface of the object being dependent on object scaling and independent of object position. Some examples of an editor include a hold toggle selection to alternate a visual display of a captured projection of a smart material and a current projection of the smart material on a surface of an object. Some examples of an editor include a pane by which multiple smart materials may be selected for a surface of an object, a pane by which a hierarchical ordering of the multiple smart materials may be specified to form a layering of texture based on the respective smart materials, a hold selection being selectively operable (e.g., individually for each smart materials, a subset of smart materials, or all smart materials), and hold toggle selection being selectively operable (e.g., individually, by subset, or all from smart materials having an active hold selection). Some examples of an editor include a freeze selection, which may be provided as an aspect of a hold selection, where moving the object and changing a spatial phase of the tiling relative to a coordinate system of the 3D model is responsive to the moving, and the editor receives a command to freeze the spatial phase of the tiling, and in response to the command, changes a coordinate system by which the tiling is specified from a world-space coordinate system to a coordinate system of the 3D model, wherein the environment space comprises a plurality of 3D models each with different model-specific coordinate systems.

Some aspects include a tangible, non-transitory, machine-readable medium storing instructions that when executed by a data processing apparatus cause the data processing apparatus to perform operations including one or more of the above-mentioned processes.

Some aspects include a system, including: one or more computing devices with one or more processors; the one or more computing devices including at least one memory storing instructions that when executed by the processors cause the processors to effectuate operations including one or more of the above-mentioned processes.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
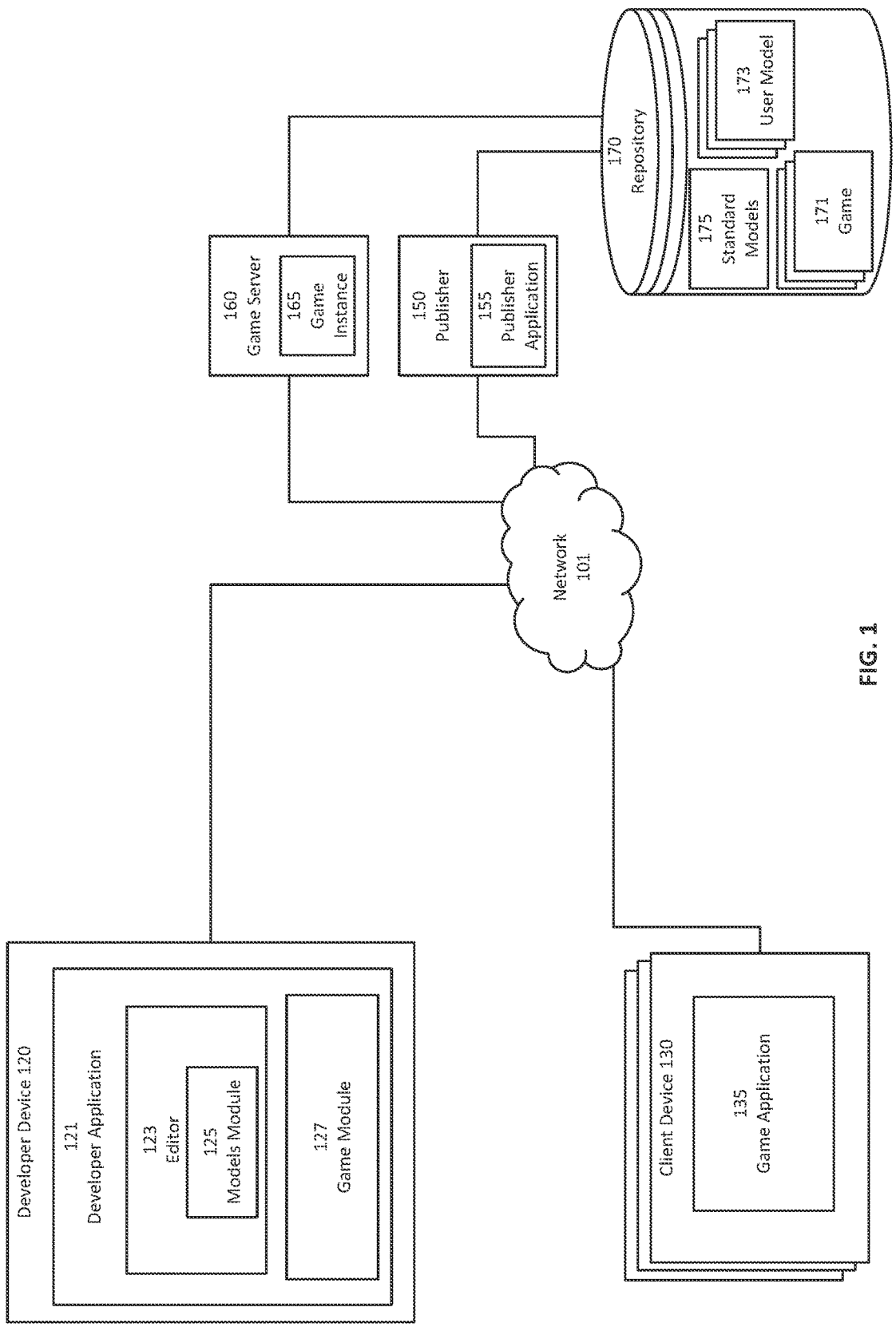
FIG. 1 is a block diagram showing an example of a computing environment by which the present techniques may be implemented.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of software-game-development tooling. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Textures (like materials applied to surfaces of polygons of a model) are difficult to configure in a game design because of stretching and z-fighting often occurs when the textures are aligned to the model (e.g., by UV mapping, where U and V correspond to orthogonal axes in pixel space of a 2D texture image), particularly when the model moves. Some embodiments mitigate this problem in a platform designed to support lay-person construction of AAA quality games, by using an improved form of world-space projection texturing. Traditional use of world-space projection texturing requires substantial skill to fully specify the mapping, but the inventors realized that certain aspects can be computed for the developer when, for example, game-development tool-providers offer off-the-shelf models for in-game characters to define the scale of the world. Some embodiments generalize from this approach with low-dimensional parametric constraints on world-space projected texturing, e.g., using world space during design and then freezing (e.g., shifting the coordinate system by which a texture is configured from a coordinate system of the in-game world to a coordinate system of the model) after design is completed or upon developer input (or partially freezing, for instance, freezing except for scaling with the size of a character model).

As noted above, geometric objects are relatively easy to create and manipulate to create geometric elements made up of multiple geometric objects. In turn, those objects are textured to apply visual features to objects or shapes (e.g., such that the wall looks like a brick or stone wall or a mountain range looks like actual mountains on a computer screen) to create the desired visuals of and within the environment. While it often easy to apply a texture (e.g., select a texture and apply it to an object), it is time consuming and difficult to texture objects effectively and efficiently when configuring the textures properly. In other words, the above application process is insufficient without significant developer inputs. In many cases, it is not enough to blindly apply a texture to an object. Texturing objects includes numerous steps and modifications during the application process such that the textures, when so applied, are visually consistent across the surfaces of an object and the objects that make up a geometric element (e.g., the various walls making up a castle). For example, scaling objects involves configuring scale of appropriate texture resolution, and texturing adjacent surfaces (e.g., of an object or multiple objects) involves configuring textures such that there is continuity in appearance where they meet. Subsequent manipulation of scale or position of an object typically breaks the current texturing, often requiring the developer to repeat all or some of the steps and modifications of the application process to correct resolutions or correct discontinuities. Developers spend time addressing the issues because ineffective texturing can cause performance issues in addition to poor resolution and discontinuities within an environment. For highly skilled developers, addressing and correcting these issues is, at worst, time consuming, but for unskilled developers, the process is exceptionally difficult as well.

Often a developer will create one or more objects, such as to construct elements of a 3-D environment. Generally, the objects are placed, scaled to a desired size, and surfaces subsequently textured to a desired level of quality (e.g., pixel density). Manipulation of a scale of an object once textured, however, can cause significant issues. For example, manipulation of the dimensions of an object alters the aspect ratio of the different geometric surfaces of the object and, consequently, that of the textures applied to those surfaces. Thus, when the object having manipulated dimensions post texturing is rendered, the texture applied to a surface appears to stretch or shrink in one or both directions normal to the face of the surface, resulting in a loss of detail or increase in detail in one or more dimensions. In other words, the object may exhibit poor graphical quality or unnecessarily high graphical quality (resulting in performance loss) when rendered due to pixel density changes (e.g., in either direction) when the texture is stretched or shrunk, respectively. Further, such manipulation of the dimensions of the object alters the aspect ratio of the texture such that the texture as applied to the manipulated object does not match that of other objects having the same texture. In other words, a block (e.g., with a L×W×D) making up a building that is manipulated into a large block (e.g., 2L×2W×2D) having a brick texture may appear as having constituent bricks that are also two times larger than other blocks making up the building. Correction of such issues, which often involve objects far more complex, requires significant development time and programmer skill to modify a texture in its application to each geometric shape so as to maintain a consistent aspect ratio of the texture on surfaces of an object to which the texture is applied as well as across multiple objects to which the texture is applied.

Similarly, it is often the case that a developer will create one or more objects, such as to construct elements of a 3-D environment. Generally, the objects are placed, scaled to a desired size, and surfaces subsequently textured to a desired level of quality (e.g., pixel density). Manipulation of a position of an object once textured, however, can cause significant issues, especially where that object is positioned adjacent to other objects. For example, manipulation of the position of an object alters the location of the different geometric surfaces of the object relative to other objects and, consequently, that of the textures applied to the surfaces of the object relative to those of the other objects. Thus, when the object having a manipulated position post texturing is rendered, the texture applied to a surface appears offset in one or both directions normal to the face of the surface, or rotated (e.g., around the normal axis), relative to one or more adjacent textured surfaces to which it previously matched, resulting in a loss of continuity between the textures of adjacent objects. Further, lack of continuity may exist in a same plane where surfaces of two objects are co-planer (e.g., an intersection of two brick roads) or at edges or vertices where surfaces of two or more geometric objects meet (e.g., walls forming a corner of a brick house) when textures are initially applied, in addition to when an object is moved (e.g., the position of a road or wall) after texturing. In other words, an object may exhibit discontinuous texturing amongst the multiple objects making up the element to when a texture is applied or when the object is moved after the texture is applied. Correction of such discontinuity issues, which often involve objects far more complex, requires significant development time and programmer skill to modify a texture in its application to each surface (and its geometric shape) so as to maintain consistent visual continuity between adjacent surfaces of different objects having at least one same texture applied as well as for the adjacent surfaces of a same object.

Some of the above-described issues with traditional texturing processes are mitigated by various embodiments described herein. Specifically, various embodiments described herein provide improvements in texturing objects within multi-dimensional environments, and particularly, 3-D environments populated with 3-D object models. Some embodiments include improvements upon the manipulation of objects having a texture applied thereto, such as by mitigating the stretching or shrinking of a texture in one or more dimensions when an object is scaled. Thus, for example, a developer may generate an object, apply a texture, and manipulate the dimensions of the object to cause an aspect ratio of at least one surface having a texture applied to change without altering an aspect ratio of the texture (e.g., when the object is rendered). In other words, techniques described herein enable manipulation of the dimensions of an object having an applied texture while maintaining original texture qualities (e.g., a defined aspect ratio of the texture). Some embodiments include improvements upon the manipulation of objects having a texture applied thereto, such as by mitigating discontinuities in a texture applied to adjacent surfaces, which may be adjacent surfaces of different objects. Thus, for example, a developer may generate a first object, apply a texture to a surface of the first object, and manipulate the position of the first object relative to a second object having a surface to which the texture is also applied to cause the surfaces to adjoin without the texture exhibiting a discontinuity regardless of whether the surfaces are oriented adjacent in a same plane, form an edge, or vertex.

In some embodiments, the above-mentioned improvements are afforded by a smart material. In some embodiments, a smart material is programmatically configured from a texture tile to afford improvements like those noted above to texturing and manipulating objects during development of a game or other 3D environment. In some embodiments, a smart material may be programmatically configured from a texture selected from a standardized set of textures and applied to one or more objects from a standardized set of objects, a resulting set of models defined by model code (which may include smart material instances) by which an application including the standardized set of textures and the standardized set of objects can render the set of models without receiving the resulting set of models. A smart material may be programmatically configured within the environment and, when selected for an object, causes the object to be rendered with visual texturing based on the configuration of the smart material within the environment. For example, projections of a smart material configured within the environment may be determined for surfaces of the object based on position and orientation of the object, and a portion of a projection that maps to a corresponding surface of the object determined for rendering the corresponding surface with the portion of material. Some examples of a smart material enable a seamless overlap in texturing (e.g., of a material) across surfaces of objects in a same plane. Some examples of a smart material enable a seamless junction of texture between surfaces of an object or different objects along an edge. Some examples of a smart material are mapped to an environment space and projected on a surface of an object independent of object scaling and dependent on object position. Some examples of a smart material are mapped to an environment space and projected on co-planer or parallel surfaces of different objects with continuous tiling of a specified texture tile or selected portion of a texture for a texture tile. Some examples of a smart material are mapped to an environment space and projected on adjacent surfaces in different planes with continuous tiling of a specified sample texture or selected portion of a sample texture. Some example embodiments include an editor by which smart materials may be implemented. Some example embodiments include programmatically configuring a smart material from a portion of a same texture tile within an environment spaced based on parameters or settings provided in association with a smart material in the editor. Some examples of an editor include environment parameters to globally scale smart materials (e.g., by scaling of a texture tile utilized by the smart material) and modify pixel density of smart materials (e.g., by down sampling or otherwise adjusting a quality of a texture tile utilized by the smart material) independent of objects. Some examples of an editor include a pane by which smart material instances may be grouped and environment parameters specified for a subset of smart material instances. Some examples of an editor include a pane by which a smart material instance may be selected and applied to an object. Some examples of an editor include a pane by which a portion of a sample texture may be selected to define a texture tile for programmatically configuring a smart material within the environment. Some examples of an editor include a pane by which a tiling direction or directions of a smart material may be selected for a texture tile, the smart material configured to define a projection of the texture tile in the corresponding direction(s) by an adjacent positioning of texture tiles. Some examples of an editor include a pane by which a smart material instance having a specified tile direction may be projected in the corresponding direction based on a position and orientation of a feature (e.g., one or more of an edge, vertex, or orientation vector) of an object. Some examples of an editor include a hold selection to capture a current projection of a smart material (mapped to an environment space) on a surface of an object (based on the mapping) and bind the captured projection to the surface of the object, the captured projection bound to the surface of the object being dependent on object scaling and independent of object position. Some examples of an editor include a hold toggle selection to alternate a visual display of a captured projection of a smart material and a current projection of the smart material on a surface of an object. Some examples of an editor include a pane by which multiple smart materials may be selected for a surface of an object, a pane by which a hierarchical ordering of the multiple smart materials may be specified to form a layering of texture based on the respective smart materials, a hold selection being selectively operable (e.g., individually for each smart materials, a subset of smart materials, or all smart materials), and hold toggle selection being selectively operable (e.g., individually, by subset, or all from smart materials having an active hold selection). Some examples of an editor include a freeze selection, which may be provided as an aspect of a hold selection, where moving the object and changing a spatial phase of the tiling relative to a coordinate system of the 3D model is responsive to the moving, and the editor receives a command to freeze the spatial phase of the tiling, and in response to the command, changes a coordinate system by which the tiling is specified from a world-space coordinate system to a coordinate system of the 3D model, wherein the environment space comprises a plurality of 3D models each with different model-specific coordinate systems.

FIG. 1 illustrates an example computing environment 100 within which smart materials may be implemented and distributed. In some embodiments, the computing environment 100 may include a developer device 120, client device 130, publisher 150, and game server 160. These components may communicate with one another via a network 101, such as the Internet and various other local area networks. In addition, embodiments of the example computing environment 100 may include a repository within which smart materials or their configurations and other assets (such as standard models including standard objects and standard textures) may be stored and distributed.

Figure 3A:
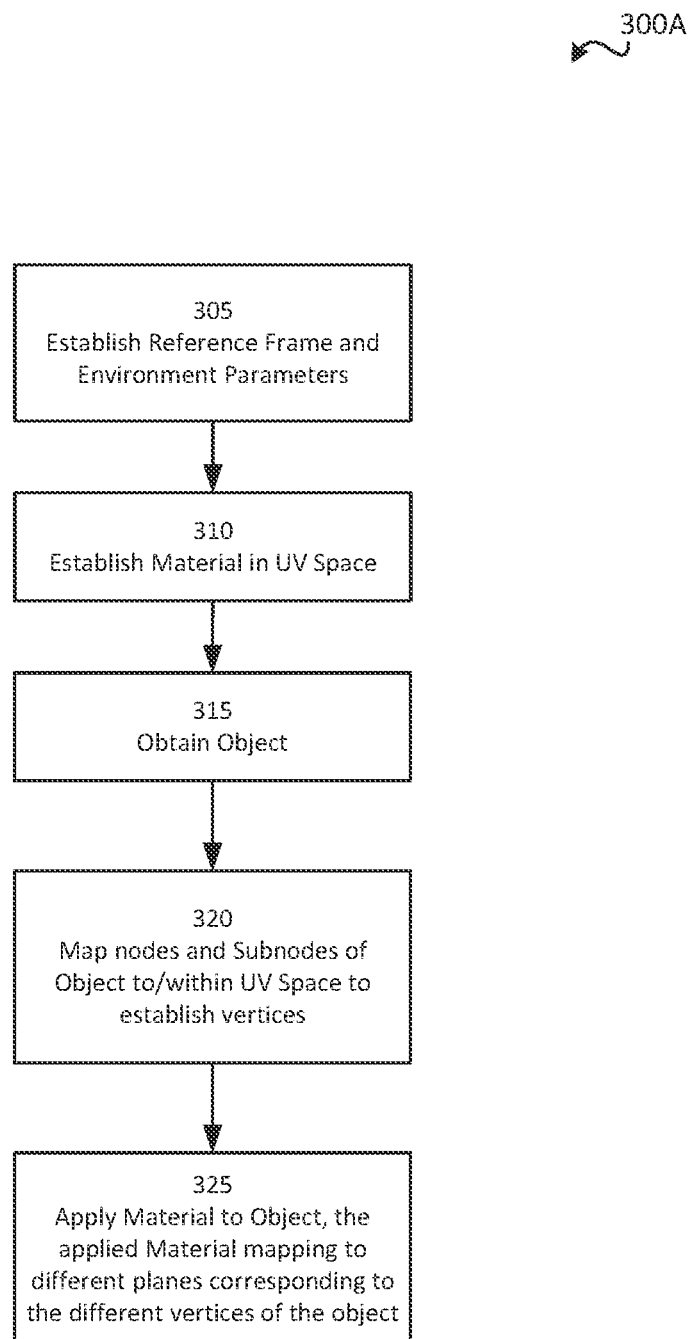
FIG. 3A is a diagram showing an example of a process for applying a smart material to an object.
Figure 3B:
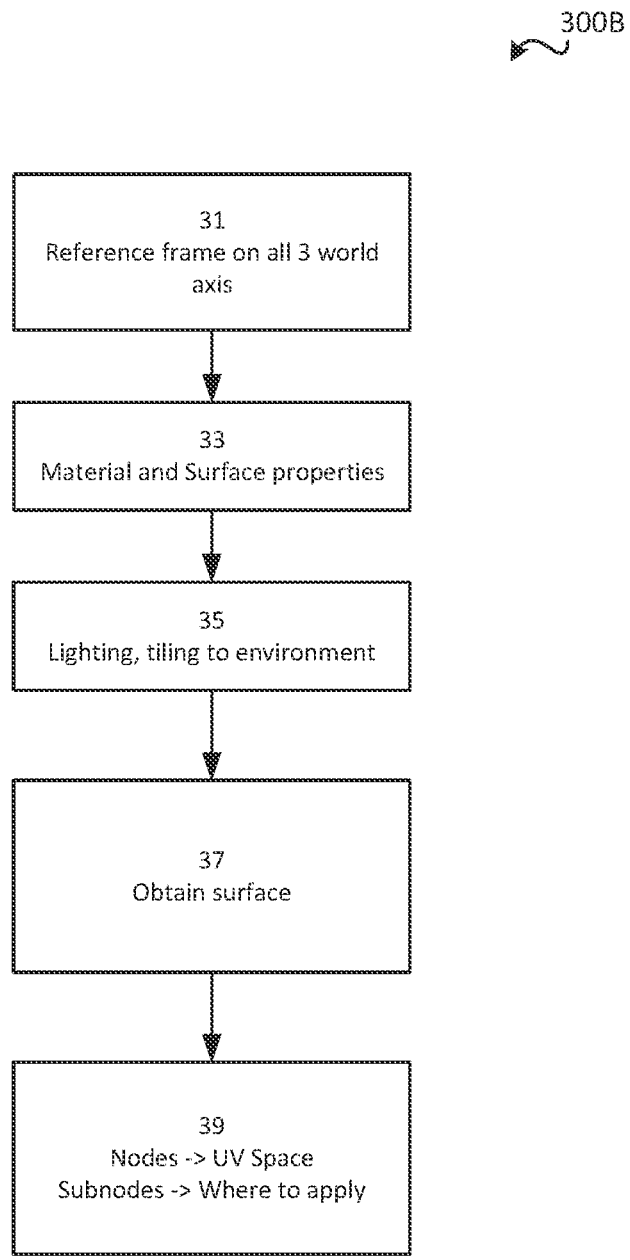
FIG. 3B is a diagram showing an example of a process for defining a smart material.
Figure 3C:
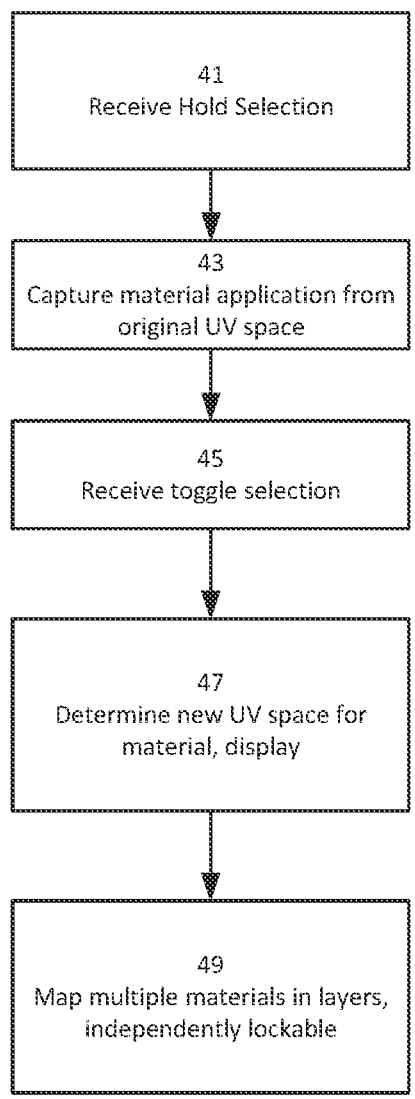
FIG. 3C is a diagram showing an example of a process for manipulating material properties of objects having one or more applied smart materials.
Figure 4:
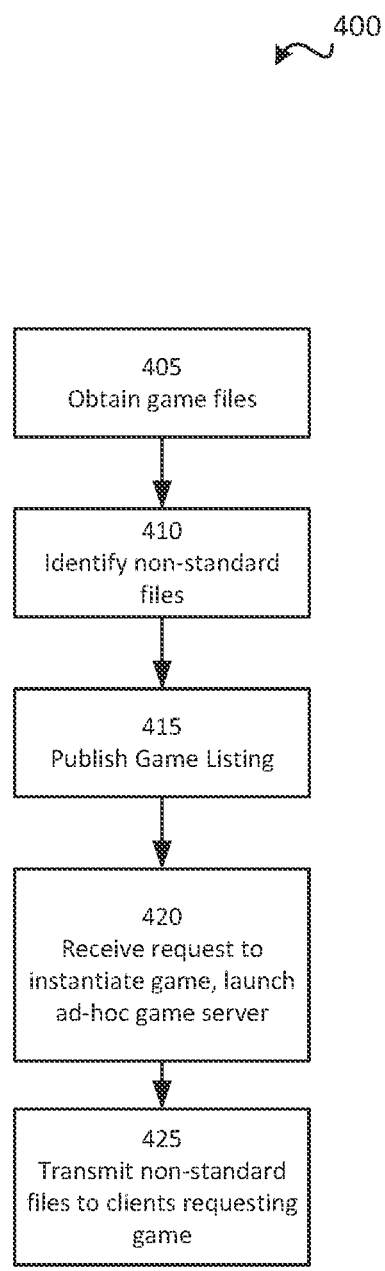
FIG. 4 is a diagram showing an example of a process for publishing a game utilizing a standardized set of objects and textures and within which smart materials are implemented.

In some embodiments, the techniques described herein may be implemented within the computing environment 100 (e.g., including each of the illustrated components) shown in FIG. 1 by executing processes described below with reference to FIGS. 3-4, illustrated by way of examples in FIGS. 6A and 6B, or otherwise described in the present application upon computing devices like those described below with reference to FIG. 7. In some embodiments, computing devices like those described with reference to FIG. 7 may include additional and/or other components specific to configurations discussed herein. For example, a developer device 120 may include components similar to those described with reference to FIG. 7 that support development of game environments and assets utilized therein, but may also represent a collection of computing devices having components similar to those described with reference to FIG. 7, some of which may be configured for specialized tasks, by which a team of developers develop various different aspects of game environments or assets. Similarly, client devices 130, servers 150, 160, and repository 170 may include some additional or other components than those illustrated in FIG. 7 (e.g., a client device may be a personal computer, mobile phone, tablet, gaming system, or portable handheld gaming system). However, each of these devices may operate in accordance with principles similar to those discussed below and with reference to FIG. 7, such as by loading instructions and other data into a memory and executing those instructions by a processor to perform various operations.

A developer device 120 may be a personal computer, like a laptop or desktop computer, server system, or, in some cases, one of the aforementioned types of client devices, operable to execute a developer application 121 utilized by a developer or support execution of a developer application on one or more devices utilized by a developer or team of developers. For example, in some embodiments, the developer device 120 may be a personal computer utilized by a user to develop a game, game-mod, game assets, and the like with a developer application 121 for consumption by client devices 130 (some of which may also be a developer device 120 or developer devices of other users). In some embodiments, a developer application 121 is a native application configured for execution by one or more client devices which may be utilized as developer devices, which is not to suggest that all client devices 130 need include a developer application, as some (or all) client devices may include only those components to load and execute a game (e.g., to play a game rather than develop one, such as to minimize installed size of a game application). Different developer devices may execute respective versions of a developer application 121, such as a given version based on a type of client device and operating system of the client device. In some cases, multiple developer devices of a same type or different types may execute those different versions of a developer application 121 and develop games for a same or different type of device. For example, a developer device 120 like a personal computer may execute a developer application 121 by which a game, game-mod, or game assets may be generated for a same device (e.g., a PC game) or a different device (e.g., a gaming console system or mobile device).

In another example, in some embodiments, the developer device 120 may be a server system utilized by a team of developers to develop a game, game-mod, game assets, and the like for consumption by client devices 130, where a developer application 121 may be a distributed application to which the developers have access (although that is not to suggest that the computing devices utilized by different developers on the team may not also execute an instance of a developer application 121). A common context for the above scenario might include an employee using a work or personal computer (e.g., a laptop or desktop computer) executing an instance of a developer application (either locally or via a server) to develop portions of a game or game-mod, such as some portion of assets (like objects, textures, etc.), or a version thereof (like a build version of a game), which are uploaded to or stored by a server of the employer hosting a distributed developer application (or repository of assets and builds) which are accessible on computing devices of other employed developers. Similarly, the developer application 121 may be operable to develop a game, game-mod, or game assets for a specific type of device (e.g., a PC, gaming console system or mobile device).

In some embodiments, a developer application 121 includes an editor 123 for creating a game, game-mod, or assets. Generally, a developer may utilize an editor 123 component to generate features of a game, like textures (or materials), objects, and other assets, configure environmental features, as well as gameplay. Particularly, the editor 123 may include a models module 125 within which game assets like smart materials, textures and objects may be defined, and game files defining the characteristics of objects or an element made up of multiple objects, like texturing properties which may be based on a smart material instance, for rendering an object or element may generated. Such game files may further define characteristics of objects or elements such as movement, rules governing movement, and the like. In some embodiments, the models module 125 may comprise a plurality of pre-populated objects (e.g., polygons and corresponding polygon meshes of a polyhedron correspond to an object, like a block, spherical polyhedron, and the like) and pre-populated textures, like a library of pre-populated objects and textures, which is not to suggest that user defined objects and textures (or materials) may not be defined and stored within the models module. A developer, such as via the editor 123, may select (e.g., via drag and drop, double click, or other interaction) different ones of the pre-populated objects to populate an environment with selected objects and construct elements from subsets of objects, such as by positioning, merging, or otherwise interacting with the objects via the editor. Similarly, a developer, such as via the editor 123, may select an object (or objects or element) and a texture to apply. The object (or objects) and any applied texture thereto may be rendered by the editor as it would appear in the environment (e.g., a castle may be constructed from objects positioned to form the castle in a given location, a texture applied to the objects forming the castle and manipulated, and the various objects rendered with the applied texture to visually display the castle on a screen of the developer device). In addition to utilizing pre-populated objects, a developer may construct new objects and textures, such as via the editor 123, whether manually or utilizing automated tools. In some embodiments, a developer may select a particular configuration of objects, textured or untextured, via the editor 123 to store a particular model (e.g., for replication).

As described herein, various ones of the objects and elements, e.g., as 3-D models, may be represented as a net, which describes a 2D representation of the polygonal mesh of a 3D model. For example, an object or element may be a 3D solid, like a polyhedron with flat polygonal faces, straight edges and sharp corners or vertices meshed together to form the shape of the 3D solid (e.g., to approximate an object, like a sphere, with a relative degree of precision). A net of a given polyhedron may specify an arrangement of edge-joined polygons in a single plane which can be folded (along edges) to become the faces of the polyhedron. A texture may be 2D tile, like an image or portion of an image, that is applied to the faces of the polyhedron. Thus, for example, a texture may be applied to the net (arrangement of edge-joined polygons), like an overlay, and the net is then refolded to create a textured 3D object from a 2D texture. In other words, the texture may be mapped to the object. In such a mapping like that described above, the 2D texture is applied to the net, which may be defined in a given way (e.g., there are numerous way to define a net of a cube, and an increase in the number of polygons utilized in a net for more complex objects exponentially increases the number of ways the net may be defined), typically manually, to minimize distortion of constituent polygons (e.g., to minimize stretching, for example). Texturing in this manner permits polygons that make up a 3D object to be imbued with surface attributes from an ordinary image, such as by assigning pixels in the image to surface mappings (e.g., coordinates) on the polygons, which are rendered according to their coordinates. However, because pixel coordinates are applied per face based on the 2D location of the pixels on the face in the net, along each edge in the net without an adjacent edge, when the net is folded back together, there exists a discontinuity between adjacent pixels because the faces correspond to entirely different locations on the 2D texture (which is a tradeoff to stretching or compressing pixel mappings in one or more directions on a face according to any distortion of a constituent polygon when laid flat vs folded, as to minimize such distortion there inherently exists more edges without an adjacent edge). Accordingly, along each of these edges, there exists a discontinuation in the texture as the texture is mapped to the 2D flat representation. As a result, developers manually adjust nets based on object orientation to limit the number of such edges visually displayed to minimize these discontinuities. Moreover, because textures are applied to the nets of individual objects, there also exists discontinuities between adjacent objects having a same texture. As a result, developers must manually adjust texture position relative to the net of one or both objects to minimize the discontinuities.

In some embodiments, the editor 123 implements smart materials (which may also be referred to or otherwise described as a programmatically configured texture instance within an environment space) for creating a game, game-mod, or assets. In contrast to the lengthy per-object net defining and texturing process described above, which suffers various shortcomings, smart materials minimize both developer time input when texturing objects and discontinuities in textured objects. Smart materials are defined and projected within the environment space (e.g., where the objects are oriented and positioned) based on locations where any given vertex of an object can map to within the environment. For example, a set of vertexes (e.g., any 3) corresponding to a given polygon of a polyhedron identify a corresponding plane of the polygon (e.g., a face of a polyhedron) within the environment space. In turn, a smart material applied to the object can be projected in the corresponding plane. The set of vertexes (e.g., each) can further identify the dimensions of the polygon, such that the smart material is rendered within the boundaries of the polygon. In other words, a polygon in a given plane takes a corresponding bounded portion of the smart material projection within the plane (noting that the projection, such as within the boundaries of the polygon in the given plane may be programmatically determined). Thus, for example, when polygons having a same applied smart material are positioned adjacently or overlapped within a same plane, portions of material (e.g., 2D texture) of the smart texture are mapped to the polygons without any discontinuities where their edges meet or faces overlap. Further, because the smart material is projected in the plane of the polygon, the various intricacies of defining a net of the polyhedron, based on an orientation of the object, to hide discontinuities between orphaned edges, reduce stretching or shrinking of a 2D texture, and other visual artifacts, are not paramount to visual quality and performance. Specifically, in some embodiments, it is sufficient to know the orientation of a polygon and its dimensions (e.g., a 2D shape oriented within a 3D environment) to project a given portion of a smart material on the polygon, and each of these variables may be determined relative to a reference frame (e.g., based on the X, Y, Z axis of the environment space). Accordingly, when a smart material is applied to an object, polygon orientations and dimensions are determined in a UV space (e.g., 2D space, where U and V represent 2D dimensions, like that of a texture), to which any given vertex of an object can map. As an example, a smart material is defined within the environment space, and may be based on a texture tile, like a sample selection of a texture (like an image) for a material, where a programmatic replication of the texture tile is determined, e.g., the tile is repeated in the U or V dimension (e.g., like a strip of tiles extending infinitely), V as a function of U or vice versa dimension (e.g., like a diagonal strip), or U and V dimensions (e.g., like an infinite plane). In turn, a projection of the smart material within the environment space may be determined, such as on polygons of objects to which the smart material is selectively applied based on the tiling (e.g., the smart texture is projected on a portion of the face of the polygon where the projection of a texture tile and face of the polygon overlap, which may be determined programmatically based on tile and tiling properties and polygon properties). As described above, an object includes polygons in different planes within the environmental space, here the smart material is translated (e.g., normal to) the face of the polygon based on the reference frame and projection. In other words, the surfaces of a polyhedron "take" the smart material as translated to a given plane rather than a texture being fitted to the shape. For example, when a surface of the polyhedron moves within its plane it "takes" the portion of the smart material translated to that portion of the plane within the environmental space. Conceptually, the applied smart material causes a material to visually show up within the boundaries of a surface of the polyhedron within a plane based on the mapping of the smart material to that plane from which a corresponding portion of the material within the plane is selected. Example embodiments of an editor 123 are described in more detail with reference to FIG. 2.

In some embodiments, a developer application 121 includes a game module 127. The game module 127 may include features similar to the game application 125, which is discussed in more detail below. Namely, the game module 127 may be operable to execute game code locally, request initialization of a game instance 165 on a game server 160, and request to join a game instance 165 (e.g., to play a game). Accordingly, as discussed herein, a developer application 121 may include some or all the features of a game application 125, and vice versa. In some embodiments, however, a game application 135 may include a subset of features of the developer application 121, like the game module 127, without editor 123 features, such as to reduce an install footprint (e.g., storage space) on client devices 130 of users only interested in playing games rather than developing them or on certain client devices (e.g., module devices or other device on which users are not likely to develop games, mods, or assets, which is not to suggest that a version of an editor or subset of editor functions, such a texture tile editing for smart materials, on such devices are disclaimed).

A client device 130 may be a personal computer, like a laptop or desktop computer, or mobile phone, tablet, gaming system, or portable handheld gaming system operable to execute a game application 135. In some embodiments, a game application 135 is a native application configured for execution by one or more client devices. Different client devices may execute respective versions of a game application 135, such as a given version based on a type of client device and operating system of the client device. In some cases, multiple client devices 130 of a same type or different types may execute those different versions of a game application 135 and participate in a same game instance 165 hosted by a game server 160, such as in a multi-player game. In other cases, a client device 130 may download and execute a standalone game application 135, such as in single player mode, in a local game instance. In some embodiments, the game application 135 provides a user access to a variety of different games, some of which may be single player games local to a client device (and which may be optionally playable without network 101 access), single player games having game instances 165 hosted on a server 160, and multiplayer games having game instances 165 hosted on a server 160 (but which may be optionally playable on a local area network or over the network 101 with a given client device 130 hosting the game instance rather than a dedicated server 160). In some embodiments, a game application 135 includes an engine for executing game files, or interfaces with an engine resident to the client device for executing game files. In either instance, the client device 130 obtains game files (and optionally the engine) to execute a game or client-side component of a game. Different games may be distributed in different ways, such as by physical media, over a network, or both, and include both locally playable campaigns or modes in addition to multi-player campaigns or modes. Thus, for example, a client device 130 may obtain a game application 135 that includes a version of a game or utilize an obtained game application 135 to obtain a version of a game, and a given game may be played in a variety of different ways. Updates to a game, such as by one or more new or updated game files of a game, may be similarly obtained. In some embodiments, those updates may be obtained at time of play, such as when joining a game instance 165 hosted by a game server 160. Further, in some embodiments, game files constituting a game may be obtained when joining a game instance 165 hosted by a game server 160. For example, the game application 135 may include a game engine and game files for a given game may be obtained upon attempting to join an instance of the given game. Such a process may be utilized where a variety of different games (like game-mods) utilize a same underlying engine but may include new or different games files defining the different assets (e.g., objects, textures, etc.), constraints, playability features, and the like for a given game (or mod). In other words, while two different games or two different mods for a game may visually appear and play entirely different, they may utilize a same underlying engine and share various standard objects or textures from which different visuals are created.

In some example embodiments, a server, like a game server 160 or publisher server 150, may include an application programming interface configured to receive requests from elements (e.g., a given application, module or interface) executing on a client device or developer device for a list of available games, game files, and the like as described herein. In some embodiments, an API of a game server 160 is configured to receive requests to instantiate a game instance or join a game instance (e.g., from a game application 135 executed by a client device 130 or a game module 137 of a developer application 121 executed by a developer device 120). In turn, when a device 120, 130, requests to instantiate or join an instance, the API may respond with a list of game files required for the game instance such that a device 120, 130 may request (e.g., from the game server, publisher, or repository) or indicate any required game files not previously obtained such that they may be pushed (e.g., from the game server, publisher, or repository) to the device. In some embodiments, the game server 160 is an ad-hoc game server on which a game instance 165 is instantiated by the publisher server 150. Thus, for example, the publisher 150 may include an API like that described by which client devices 130 request to instantiate a game instance or request to join a game instance. In turn, the publisher 150 may launch a game server 160 and game instance 165 and respond with instruction by which a client device can join the game instance. Under either configuration, game files required for a game instance may be provided to a client device requesting instantiation of a game or requesting to join an instantiated game instance.

In some embodiments, an API of a publisher 150 is configured to receive requests to publish (or update) a game (e.g., from a developer application 121 executed by a developer device 120). In some embodiments, the request includes a listing of game files (e.g., and hashes thereof) for the game. In turn, the API may respond with an indication of one or more game files not included in the repository, which may include a request for the indicated game files or instruction to upload the game files to the repository. Upon processing a request to publish a game, a publisher application 155 may handle publication of the game, such as by listing the game and corresponding game information in a list of games. In some embodiments, the game is listed in a private listing associated with the developer (e.g., that requested publication), or a team of authorized developers, like under a given account, and may be accessible by authorized parties (e.g., to demo, playtest, etc., such as by launching a private game instance 165). In some embodiments, the list of games is a public list of games accessible to client devices 30 via a game application 135. In some embodiments, a developer may initially publish a game and subsequently indicate whether the game is should be listed publicly to client devices 130. In some embodiments, a device may request to play a listed game and the publisher 150 may launch a game server 160 including an instance 165 of the game in response to the request, and the game instance 165 may be indicated in association with the game such that a plurality of devices may join a given game instance 165. In some embodiments, a publisher 150 may utilize a publisher application 155 to review game files prior to listing a game publicly, such as by reviewing one or more game files not included in the repository. Specifically, the publisher application 155 may be operable to review the assets specified by the game files to determine whether there exists objectionable content, either to assign an audience rating or reject publication subject to removal of the objectionable content. For example, various game files may specify configurations of objects and texturing thereof which may be rendered by the publisher application 155 and reviewed for objectional content.

As described above, a game server 160 may host a game instance 165. The game server 160 may be provisioned by a publisher 150 to host the game instance 165, such as on demand, when a device requests to play a game. For example, a game server 160 may be provisioned to execute a game 171 included in a repository 170. While the game instance 165 is active, other devices may optionally join the game instance 165. A game 171 may include various game files, like game code and model code. The model code of a game 171 may identify the various standard models (e.g., models utilizing standard textures and objects) 175 included in the game, which may be included in a game application 135 provided to client devices 130 and the developer application 121 provided to developer devices 120. Thus, for example, the game files necessary to join a particular game instance 165 may be relatively lightweight, such as various scrips and the like, with relatively small file sizes (e.g., compared to 3D models). In other words, the model code may describe how to construct models from standard objects and textures, which are already available to a game engine. However, developers may also generate other non-standard models, referred to herein as user models 173, such as by creating and utilizing a non-standard object or texture. In such cases, game files may also specify one or more user models 173 for a game that cannot be constructed from the standard models 175 alone. Accordingly, one or more objects or textures not included in the standard model 175, along with the model code to construct a model from the objects or textures, may be transferred to a client device. In some embodiments, a listing of game indicates whether the game is based on standard models 175 or includes user models 173, and may further indicate a file size associated with the user models 173 necessary to run the game.

Some or all of the information utilized to launch a game server 160 or game instance 165 may be stored within the repository 170. For example, when the publisher 150 receives a request to publish a game from a developer device 120, such as in response a to a user selection to publish the game via an interface of a developer application 121, the publisher 150 may obtain the game files and store a game 171. In some embodiments, a publisher application 155 may parse the game files to identify user models 173 which cannot be constructed from standard model 175 information. The publisher 150 may request from the developer device 120 information corresponding to the user models and stored the user models 173 within the repository 170. In some embodiments, the repository 170 may include information about developer accounts, such as that for an individual developer or constituent members of a team of developers. User models 173 and games 171 may be associated with a given developer account or accounts of respective team members such that developers can manage aspects of a published game.

Figure 2:
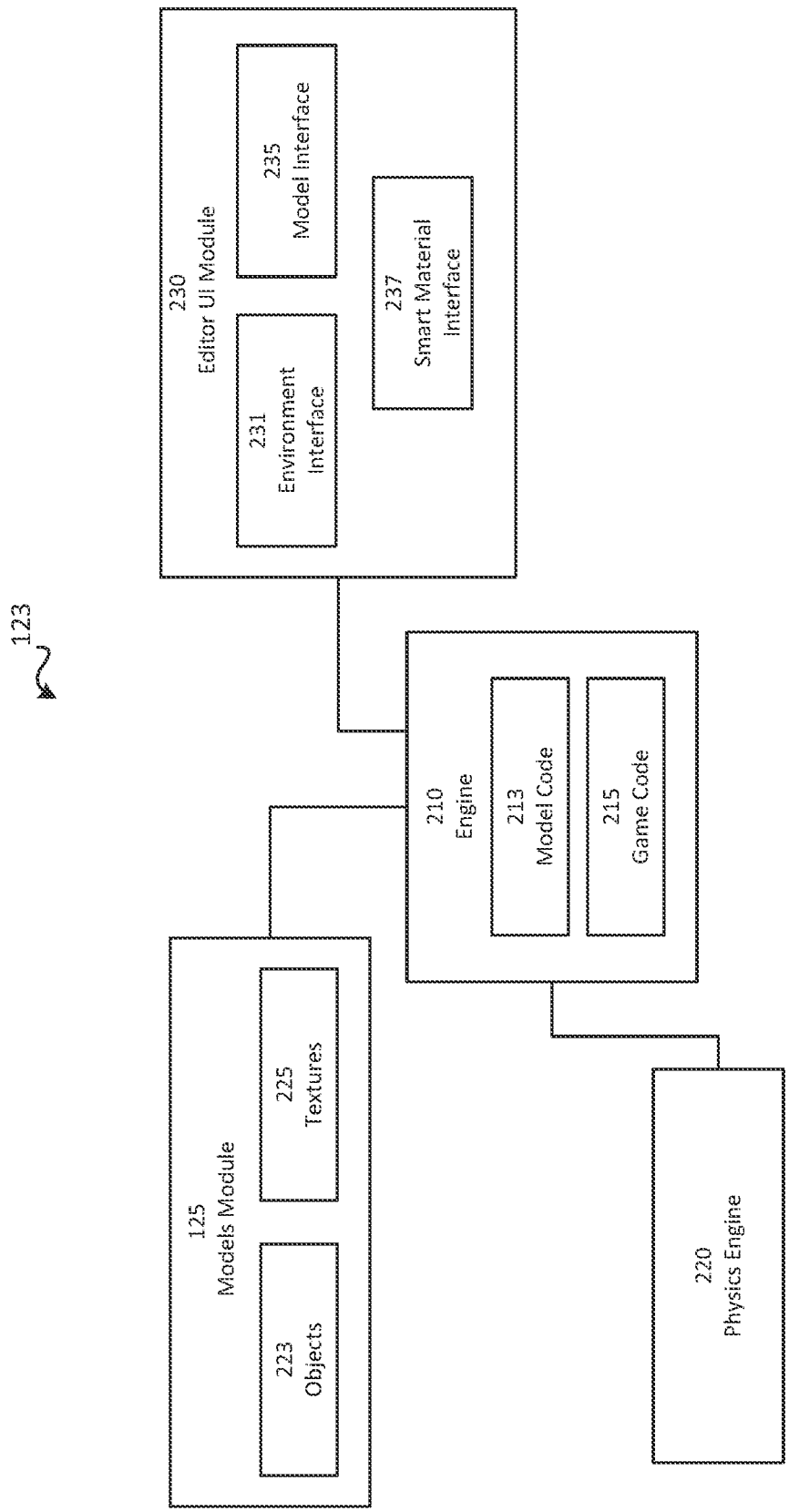
FIG. 2 is a diagram showing an example of an editor by which smart materials may be implemented with the example computing environment.

FIG. 2 illustrates an example configuration of an editor 123 within which smart materials may be implemented. Such an editor may be included in a developer application, like a native application, distributed to and executed on devices of developers. The various illustrated blocks of the editor 123 illustrate example components of 3D editor within which an environment space may be initialized, populated with objects, and texture or material properties added to those objects. In various embodiments, a material may be applied to an object based on a smart material instance selected for the object. Additional aspects of an editor 123 may include defining gameplay aspects and the like.

In some example embodiments, an editor 123 includes an engine 210, like a game engine, which executes computer program code, like model code 213 and game code 215. For example, the engine 210 may include a rendering engine, or renderer, which executes model code 213 to display visual graphics, such as on a screen of a computing device. The model code 213 may describe one or more objects or elements comprised of multiple objects in a data structure that contains geometry information for rendering a view of the 3D object (e.g., in 2D from a given viewpoint). The rendering engine takes the model code 213 and other information, e.g., viewpoint position, as inputs to render a view of the 3D object, or environment including various 3D objects, on a screen or screens. In some embodiments, the engine 210 initializes an environment space within which objects 223 may be placed. As objects are placed, model code 213 may be generated by the engine 210 to define their position, orientation, etc. with respect to a reference frame within the environment space, and subsequently rendered based on a viewpoint (e.g., from which a developer is viewing the object via an editor UI generated by the editor UI module 230) with respect to the reference frame. The data structure may be augmented with additional information such as texture (or material), lighting, and shading information to enhance the visual rendering of 3D objects. For example, a material or texture may be applied to a 3D object (or determined for faces of the object based on a smart material) and information about the texturing stored within the data structure. Light sources (e.g., intensity, location, color, etc.) may be defined within the environment and the effects of those sources may be determined with respect to the 3D object, such as by shading, which may be layered on a texture or material such that some portions of the object when rendered appear darker (or lighter) than others. The game code 215 may include information, like rules, and information by which the models are moved and how users can interact with elements of the game, like the areas a user can explore, interact with, and the like. In some embodiments, the game code 215 may be generated in a fashion similar to objects, such as by developer inputs corresponding to changes in positions of objects, dependencies, and other factors.

In some example embodiments, the engine 210 may also interface with a physics engine 220 of an editor 123. The physics engine 220 may determine how 3D objects respond to user inputs (e.g., does a 3D object pushed off a ledge fall or float, the trajectories and the like), events defined in game code, collisions, and the like. Variables associated with different ones of the objects may be defined to simulate factors like weight (e.g., heavy block should move slower than a light block when pushed by an avatar of a user and the like), and such variables may be encoded in the data structure, which is processed by the physics engine 220 to determine position and orientation for objects in response to events like those described above.

In some example embodiments, an editor 123 includes an editor UI module 230 by which user interfaces are generated. For example, the editor UI module 230 may generate user interfaces like an environment interface 231, model interface 235, and a smart material interface 237 among others, like a viewing pane displaying a current view of the environment and objects therein as rendered by the engine 210.

The environment interface 231 may include one or more panes by which users may define or adjust global parameters associated with the environment space. Global parameters may include a reference frame of the environment space by which orientation and position of objects and their polygon surfaces (e.g., in X, Y, Z 3D space) may be defined. Smart materials may also be translated to a plane based on the reference frame, such as a plane of a surface on which to project a portion of material that has a given orientation and position in 3D space. For example, the reference frame may have an origin point, and 2D texture tiles of a smart material are tiled from the origin point. The smart material may, in turn, be translated to a plane in 3D space, conceptually, by rotating, turning, or otherwise manipulating the 2D texture anchored at the origin point to adjust smart material properties. More specifically, the smart material may be oriented to have a given normal vector defined by X, Y, and Z coordinates. In some embodiments, this translation is performed on object features, such as based on the nodes of objects (e.g., 3D descriptors for objects), to determine groupings of subnodes (e.g., 2D descriptors) that bound an area within a plane that maps to the smart material, such as within a 2D UV space for which a tiling of the material of the smart texture is defined.

The model interface 235 may include one or more panes by which users may select an object for placement within the environment space and adjust properties of objects. A developer may utilize multiple objects to create an element of multiple objects. For example, the model interface 235 may include a listing of objects 223 included in the models module 125 and which the user may select and position, such as by drag and drop, within the environment. Thus, for example, an instance of an object may be added to the environment, and multiple different objects may be added and grouped as desired to create elements within the environment. Object instances may be grouped and otherwise managed via the interface.

The smart material interface 237 may include one or more panes by which users may select a texture 225 (or material) for utilization within the environment space and adjust properties of the texture. In some embodiments, the textures may include a set of pre-configured smart materials in addition to texture samples. The smart material interface 237 may include a pane by which a user may define an instance of a smart material within the environment. In some embodiments, a given texture or material (or pre-configured smart material) may be utilized to define multiple different instances of a smart material, such as if divergent scaling is desired for some areas of the environment compared to others. In some embodiment, the pane includes an image of a texture or material, like a texture tile. In some embodiments, a texture tile may be selected from the image, such as by selecting a region of the image to correspond to a texture tile. Tiling properties for programmatically configuring a smart material from a texture tile may also be specified, such as a direction in which an origin texture tile should be replicated (e.g., horizontally, vertically, or both in a plane). In some embodiments, a preview of the tiling is rendered, such as within the environment, and a user may adjust a slope, offset, or other aspects for the tiling direction. Further, the pane may include a scaling option, such as to adjust a relative size of a texture tile within the environment (e.g., a brick of a brick texture should look very large to an ant within in a human-world-like environment and the opposite to a giant; similarly, an ant may utilize tiny bricks to construct a home and a giant may use large bricks from the perspective of a human-world-like character). The pane may list defined smart materials (which may also include default smart materials based on a common scaling, which when altered are indicated as a defined smart material instance) from which a developer may select to apply to an object. In turn, when the smart material is applied to an object, model code corresponding to the object is analyzed by the engine 210, such as to translate surfaces of the object into smart material space (or vice versa). A surface of an object is mapped to a 2D material area of the applied smart material to obtain a mapping of pixels of material (e.g., from pixel locations within a texture tile) within the boundaries of the face based on the configuration of the smart material. The engine 210, in turn, renders the mapped pixels on the face of the object. Thus, for example, when the engine 210 reads model code generated for the object that specifies an applied smart material, the engine 210 obtains properties of the smart material instance (e.g., tiling properties, texture tile, etc.) and renders material aspects within polygons of the object from a based on properties of the smart material.

In some embodiments, a developer application 121 includes an editor 123 for creating a game, game-mod, or assets. Generally, a developer may utilize an editor 123 component to generate features of a game, like textures, objects, smart material instances, and other assets, configure environmental features, as well as gameplay. Particularly, the editor 123 may include a models module 125 within which game assets like textures and objects may be defined, and game files defining the characteristics of objects or an element made up of multiple objects, like texturing (such as by configuring an instance of a smart material), for rendering an object or element may generated. Such game files may further define characteristics of objects or elements such as movement, rules governing movement, and the like. In some embodiments, the models module 125 may comprise a plurality of pre-populated objects (e.g., polygons and corresponding polygon meshes of a polyhedron correspond to an object, like a block, spherical polyhedron, and the like) and pre-populated textures, which may include pre-populated smart materials in addition to (but may be based on) pre-populated texture images. A developer, such as via the editor 123, may select (e.g., via drag and drop, double click, or other interaction) different ones of the pre-populated objects to populate an environment with selected objects and construct elements from subsets of objects, such as by positioning, merging, or otherwise interacting with the objects via the editor. Similarly, a developer, such as via the editor 123, may select an object (or objects or element) and a texture (or smart material) to apply. The object (or objects) and any applied texture (or smart material) thereto may be rendered by the editor as it would appear in the environment (e.g., a castle may be constructed from objects positioned to form the castle in a given location, a texture applied to the objects forming the castle, and the various objects rendered with the applied texture (or material based on the applied smart material) to visually display the castle on a screen of the developer device). In addition to utilizing pre-populated objects, a developer may construct new objects and textures, such as via the editor 123, whether manually or utilizing automated tools. In some embodiments, a developer may select a particular configuration of objects, textured or untextured, via the editor 123 to store a particular model (e.g., for replication).

FIG. 3A is a diagram showing an example of a process 300A for applying a smart material to an object. The process 300A may occur within an example computing environment, such as the example computing environment 100 illustrated in FIG. 1, and may be implemented with an editor like that described with reference to FIG. 2.

In some embodiments, the process includes establishing a reference frame and parameters of an environment space 305. The reference frame may define X, Y, and Z directions and a location of an origin point within the environment space. In some embodiments, parameters of the environment space may define a set of possible orientations of planes of objects within the environment or a density of vertex locations. In some embodiments, a quality parameter associated with the environment space is operable to adjust a size of the set of possible orientations or density of vertex locations, a larger set or higher density indicating a higher quality, and a smaller set or lower density indicating a lower quality.

In some embodiments, the process includes establishing a 2D texture tile for a smart material in UV space 310. For example, a texture tile, which may include visual properties of a material, may be selected from a 2D image, and an anchor point (which may be mapped to a point in 3D space) may be selected (e.g., automatically at a corner of a texture tile, a center of the texture tile, or manually). In some embodiments, the 2D image or texture tile may be selected from a standard set of textures, which may be texture tiles or 2D images of which the entire image or subset may be selected as a texture tile. Replication properties of the texture within the UV space may be defined, such as whether the texture replicates in the U or V direction, both, or as a function of one or the other. In some embodiments, a visual representation of the material (e.g., as as tiling of texture tiles) is displayed during the configuration process, such as within the environment at the origin point or as projected in a location normal to the rendered viewpoint at a given distance (e.g., variable or predefined) based on the origin point (e.g., the anchor point of a texture tile for the material may be positioned within 3D space based on an offset from the origin point within 3D space, and the texture tile rendered normal to a viewpoint). The visual representation of the material may also convey the scale of the material at the given distance, and a pane may include a scale variable by which a developer may adjust a scaling of the material (e.g., by a relative size of a texture tile). In some embodiments, a developer may manipulate the visual representation of the texture to adjust a direction (e.g., as a function of U and V in the UV space) in which texture tiles of the material are tiled and projected (e.g., to have a slope, offset, etc.). For example, a developer may desire to have a brick material that is projected normal to a surface and where the bricks are level with a horizontal axis of the environment (e.g., for a level brick house), and, also or alternatively, a brick material that is projected normal to a surface and where the bricks are sloped relative to the horizontal axis of the environment (e.g., for a leaning brick tower). In turn, a smart material instance may be instantiated based on configuration properties like those above.

In some embodiments, the process includes obtaining an object 315. For example, an object may be selected form a standard set of objects and placed within the environment space by a developer. For example, a pane of a user interface may include a list or previews of objects in the standard set from which the developer may drag and drop into the environment. In some embodiments, a developer may create or load a user object, which may be displayed within a pane of a user interface including a list or previews of user objects from which the developer may drag and drop into the environment. The developer may size, position, and orient the object within the environment as desired.

In some embodiments, the process includes determining a mapping of nodes and subnodes of an object to and within a UV space to establish vertices 320. In some embodiments the nodes correspond to a set of vertices of the object, which may define position, orientation, and size of the object in 3D space. For example, each object may include at least three nodes. Subnodes may correspond to the various polygon surfaces of the object which need not be necessarily tracked as nodes (e.g., 3 vertices of a cube are sufficient to define size, orientation, and position). Nodes may also be described in other ways, for example, a cube may be described by a normal vector of a particular face and a size of the vector (e.g., corresponding to scale), or based on a set of vectors corresponding to a particular origin vertex of the cube. Thus, for example, the nodes may be a reduced set of information that describes the position, orientation, and size of an object, like a polyhedron, and from which other information about the object may be determined. In some embodiments, a number of subnodes are determined, and groupings of subnodes may correspond to respective polygon faces of a polyhedron. In some embodiments, the set of vertices for each face is determined based on the subnodes, and from the set of vertices a normal vector to the face and face boundaries may be determined. Thus, for example, based on one or more of the vertices and normal vector, the face in 3D environment space may be mapped to a UV space based on the reference frame of the environment space.

In some embodiments, the process includes applying a smart material to the object 325. For example, a developer may select an object within the environment space and select a smart material to apply to the object. As described previously, the smart material may include a material defined within UV space and properties within the 3D environmental space for projecting material based on the reference frame, and vertices corresponding to the faces of the object may be mapped to UV space based on the reference frame. For example, the UV mapping may be based on a normal vector describing a plane, and the vertices as U,V coordinates describing 2D coordinates within the plane. In turn, the 2D coordinates of the surface within the plane may be mapped to a projection of material within the same plane (or vice versa) based on the configuration of the smart material (e.g., based on tiling direction, orientation, etc. relative to the reference frame). Thus, for example, a given face of an object may be translated to a set of 2D coordinates within the UV space of the material, and those 2D coordinates are mapped consistently across faces having a same normal vector (e.g., within a plane such that another object having another face in the same plane that is orientated adjacent or overlapping with the given face does not exhibit a discontinuity in material texturing when a same smart material is applied). Thus, for example, pixels of the material (e.g., as determined from tiling of texture tiles) within the UV space may be mapped within the boundaries of the face. In other words, for a same plane, such as indicated by a normal vector, a same 2D coordinate location within the plane maps to a same pixel location of the material (which corresponds to a given pixel of a texture tile), even across different objects. As a result, movement of the face within the UV space shifts the boundaries and the change in pixel mapping causes the face to take the material projection in the new location. In some embodiments, because vertices are mapped, faces sharing a vertex or an edge (e.g., sharing two vertices) may be mapped to same locations within the UV space, and the different normal vectors indicate orientation of material projection of the smart material, like bisecting planes, based on the normal vectors, to map pixel locations within the material (that correspond to pixels of the texture tile based on tiling properties) on the different faces of the object.

FIG. 3B is a diagram showing an example of a process 300B for defining a smart material. The process 300B may occur within an example computing environment, such as the example computing environment 100 illustrated in FIG. 1, and may be implemented with an editor like that described with reference to FIG. 2.

In some embodiments, the process includes defining a reference fame on a 3-word axis, like within an X,Y,Z 3D space corresponding to an environment 31; defining material, and surface properties 33, such as within a material pane of a user interface; lighting and tiling of a texture tile for the material to the environment 35, such as by determining lighting properties and shading based on point locations and orientations within the environment; obtaining a selection of a surface 37 oriented within the 3D environment space; and determining nodes of the surface 37, such as nodes corresponding to the point locations and corresponding to a material or texture having determined lighting and shading properties at the point locations, and subnodes corresponding a face of the object for rendering a corresponding area of the material (e.g., such as from an area within which a tiling of a texture tile is defined).

FIG. 3C is a diagram showing an example of a process 300C for manipulating texturing properties of objects having one or more applied smart materials. The process 300C may occur within an example computing environment, such as the example computing environment 100 illustrated in FIG. 1, and may be implemented with an editor like that described with reference to FIG. 2.

As describe above, for an object having an applied smart material, movement of a face of the object within the UV space shifts the boundaries of the 2D texture mapped to the face and thus causes a change in pixel mapping. Conceptually, this can be thought of as moving a white sheet of paper across a larger screen on which a smart material is projected; the sheet of paper takes the portion of the material being projected within its boundaries in a given location. Oftentimes, such a configuration is preferred, such as utilizing multiple sheets to build a wall of a castle with an opening for a door. However, some elements of the castle, like a hidden sliding wall, which can be thought of as the paper above, should keep the material from its original location rather than a changing projection based on a new location. Accordingly, some embodiments include a process by which a current smart material projection may be held by an object.

In some embodiments, the process includes receiving a hold selection 41 and capturing a smart material projection from the original UV space (e.g., like a current UV space) 43, which is associated with a face of an object. Continuing with the aforementioned example, this can be viewed as capturing a current portion of the material being projected on the sheet of paper such that when the sheet of paper moves, it takes that portion of the material with it. In other words, the face retains the smart material pixel mapping locations responsive to the hold selection 41, such as by storing the original mapping information (e.g., portion of the material to which the face maps in UV space) in association with the face. In some embodiments, individual, or a collection of faces of an object may be selected to hold the smart material texture, and the collection of faces may include each face of the object or a subset of faces. Notably, the actual portion of the material for the space need not be stored, but rather the original UV space information by which that portion can be referenced.

Some embodiments may provide a freeze selection as an aspect of a hold selection, where moving the object changes a spatial phase of the tiling relative to a coordinate system of the 3D model responsive to the moving. For example, the spatial phase of the tiling may be frozen to one or more coordinates of an object, like as previously projected on a face of the model, and movement of the model or object, such as to orient or reposition one or more faces subject to the freeze selection may cause a modification of the projected tiling from the original UV space. For example, the projected tiling within a plane may be based on a modified UV space responsive to the coordinates of face of the object captured when the editor receives the command to freeze the spatial phase of the tiling, like an offset. In other words, in response to the command, the process may change a coordinate system by which the tiling is specified from the world-space coordinate system to, at least in part, coordinate based on the coordinate system of the 3D model. In some embodiments, the freeze selection may bind a desired tiling of a smart material to be based on an object for which the freeze was selected, like an offset that modifies tiling projection which may extend to other objects to which the same instance of the smart material is applied, or the freeze selection may be performed on a per-object basis. In some embodiments, texturing properties (e.g., the one or more textures as tiled to faces) of an object subsequent to a freeze selection may be elected to be stored by a user to cause the storage of tiling specified from a world-space coordinate system (or modified UV space based on any offset) to a coordinate system of the 3D model, such as to capture a UV wrap specific to the model, which may no longer tied into the world space projection, and by which the model may be replicated with the captured texturing properties. The environment space may comprise a plurality of 3D models each with different model-specific coordinate systems.

In some embodiments, the process includes receiving a toggle selection 45; whereby the stored original mapping of the material to the face may be toggled with a new mapping based on a new location of the face. In response to the toggle selection 45, the process may include determining the new UV space of the face (e.g., based on the new location of the object), and rendering the new pixel material mapping on the face. Deselecting the toggle causes the rendering of material pixels based on the stored original mapping of the material to the face.

In some embodiments, the process includes receiving a request to map multiple materials in layers 49. Accordingly, in some embodiments, multiple smart materials may be applied to an object or face of an object, such as in sequence, or in batch, and via a pan of the user interface a hierarchy of the layers may be specified. Each layer may include corresponding properties, like transparency, etc., as well as independent selections for holding a current smart material projection and toggling the captured projection. In some embodiments, it may be desirable to hold some materials while not holding others.

FIG. 4 is a diagram showing an example of a process 400 for publishing a game including a standardized set of objects and textures. The process 400 may occur within an example computing environment, such as the example computing environment 100 illustrated in FIG. 1.

In some embodiments, the process includes obtaining game files 405, such as from a developer device; identifying non-standard files 410, such as models including objects or textures not in a standard set; publishing a listing of the game 415, such as in a list of games provided in response to an API request for a list of games; receiving a request to instantiate the game 420, such as via an API request to indicate the game, and launching an ad-hoc game server responsive to the game files; and transmitting the non-standard files 410 and game files, but not standard files containing standard objects or textures, to client requests requesting to join the game via the API. The game files contain all the information required for the game, any user models referend in the game files that include elements different than standard models may be obtained via the API.

In some embodiments, step 410 comprises identifying user models based on user generated objects or textures by parsing the game files to extract the user objects and textures not represented in a standard set of objects and textures; determining a size of the extracted user object and, which may be compared to a threshold, such as a platform dependent threshold; rendering the extracted objects and textures based on model code (e.g., a model code may include information for rendering an object, a selected smart material for the object, and a smart material instance by which material rendering on object surfaces can be determined) referencing at least one user object or texture, which may be subject to approval; and storing permissible user objects and textures (e.g., objects and textures not exceeding a threshold size).

Figure 5A:
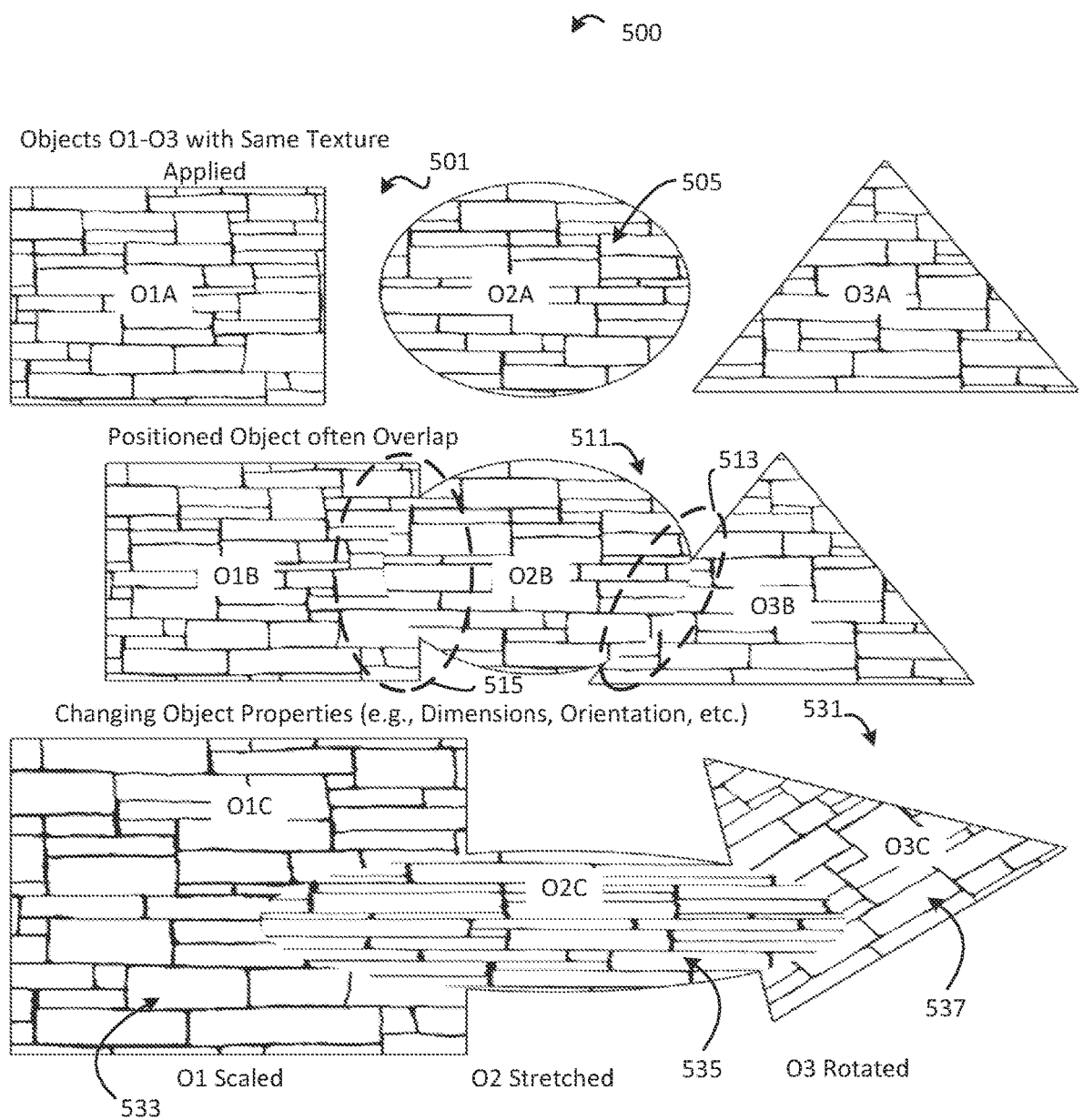
FIG. 5A is a diagram showing an example reaction of a traditional texture applied to surfaces of objects when those surfaces are manipulated as indicated in some examples.

FIG. 5A is a diagram showing an example reaction of a traditional texture applied to surfaces of objects when those surfaces are manipulated as indicated. For example, various objects O1A, O2A, O3A may have a same traditional texture 505 applied 501, which is individually attributed to the different objects. Accordingly, when such objects are repositioned 511 or otherwise positioned, such as to overlap, even though the same texture is applied to each object there exists discontinuities. For example, the objected may be positioned to overlap, like the objects denoted by O1B, O2B, O3B, which overlap at locations 515, 513. As shown, the texture across object O1B, O2B at overlap location 515 and across O2B, O3B at overlap location 513, exhibit discontinuities in texture even though the texture 505 individually applied to each object remains at a same scale. This is because a traditional texture 505, as individually applied to each object, is tied to the object individually. Scaling and rotation 531 also cause discontinuities, as well as other issues, as pixel density of the applied tradition texture changes with object scale and the individually attributed textures rotate with the objects. Accordingly, when such objects are manipulated 531 by developers, such as within an environment and positioned adjacent or to overlap, like the objects denoted by O1C, O2C, O3C, aspect ratio consistent scaling 533, stretching 535, and rotation 537 causes each to exhibit discontinuities in texture relative to the other objects. As a result, a developer must tune the texture of each object individually by a variety of variables to minimize such discontinuities.

Figure 5B:
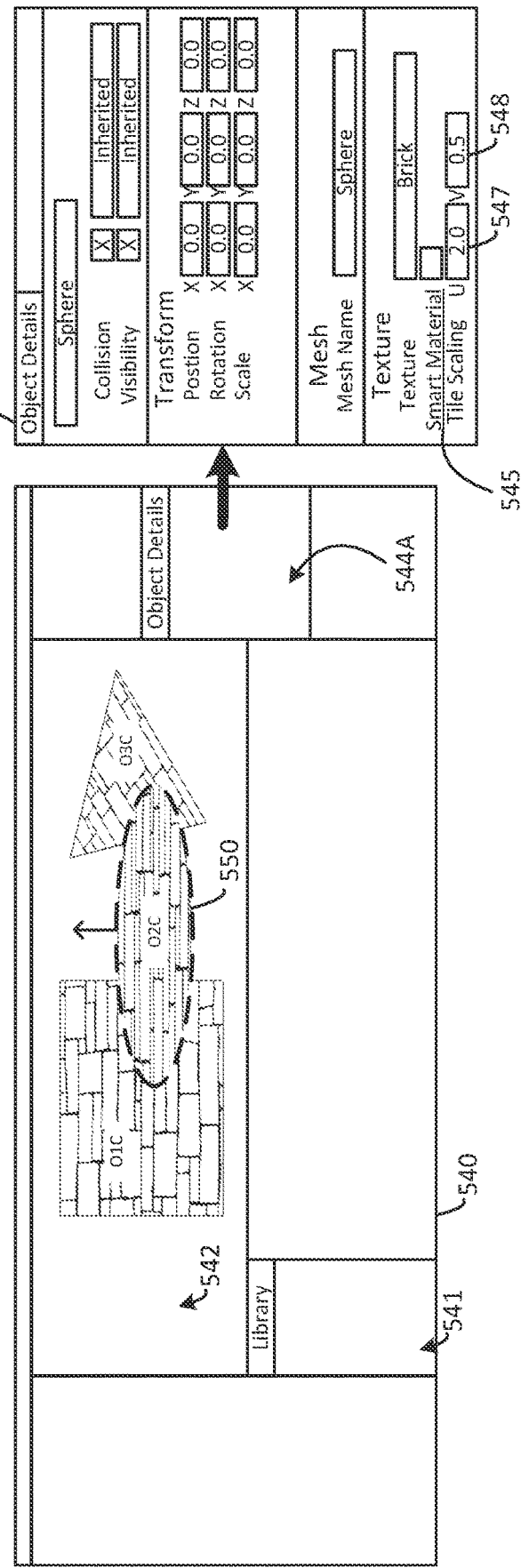
FIG. 5B is a diagram showing an example user interface with scale variables for a traditional texture applied to a surface of an object illustrated in FIG. 5A.

FIG. 5B is a diagram showing an example user interface with scale variables for a traditional texture applied to a surface of an object illustrated in FIG. 5A. As shown, a user interface 540 of an editor may include a variety of different panes. Examples of which may include a library pane 541, which may include lists of assets, like objects, textures, models, etc. available from a models module, which may populate the library with local assets or assets obtained over a network, such as from a repository. For example, a models module of an editor may comprise a plurality of pre-populated objects (e.g., polygons and corresponding polygon meshes of a polyhedron correspond to an object, like a block, spherical polyhedron, and the like) and pre-populated textures (along with user defined objects or textures or models) which may be represented within the library pane 541.

An environment pane 542 may display a rendered environment, which may include one or more assets rendered within environment, or otherwise display a rendering of assets. For example, objects or models as a collection of objects may be rendered within the environment with any applied texture, shading, etc. A user may utilize the library pane 541 to browse assets, like objects or models, to add to an environment displayed within the environment pane 542, and browse textures within the library pane to texture those objects (which is not to suggest that textures cannot be selected within another pane, like one providing details corresponding to an object or model). For example, the user may drag and drop, select to add, or otherwise add a plurality of objects, like O1C, O2C, and O3C, from the library 541 to the environment displayed within the environment pane 542. The user may configure those objects within the environment via the environment pane 542, such as by selecting an object, and modifying properties of the object within the environment, like position, scaling, orientation, etc., and those modifications may be rendered in accordance with the perspective the environment is viewed within the environment pane. FIG. 5B, for example, illustrates the selection 550 of object O2C for manipulation, and object O2C may be rotated, scaled, and positioned as desired by the user within the environment and rendered in accordance to a current view of the environment within the environment pane 542. FIG. 5B also illustrates the application of a texture to three objects, O1C, O2C, and O3C, such as by selection from the library pane 541 (or alternatively within another pane, like an object details pane), where each object is positioned, scaled, or oriented within an example environment as desired by a user. Details corresponding to assets, like objects, within the environment may be displayed within another pane, like object details pane 544A. A user may interrogate an asset, like an object, such as by selection 550 within the environment pane 542 or object details pane 544A, or drop down menu with the object details pane 544A, to view details, like object details 544B, corresponding to the object.

In the illustrated example, objects O1C, O2C, and O3C are each configured in some way as might be desired by a user when creating an environment. For example, one or more objects may be positioned to overlap as shown, or might be positioned adjacent to each other. They may be scaled as desired, whether uniformly to maintain an aspect ratio, e.g., O1C, or without maintaining an aspect ratio, like in one axis more than another, e.g., O2C, or rotated relative to other objects, e.g., O3C. Example object details 544B are shown in reference to an example selection of object O2C for configuration. The object details pane 544B may indicate information for the selected object, like object properties and texture properties, the latter indicating U-V tiling scaling properties and texture name for the object when a texture is applied. For an applied texture, both the U 547 and V 548 tile scaling properties may be indicated, which modify the texture instance applied to the object. These variables are tied to each of the objects O1C, O2C, and O3C individually. Accordingly, when such objects are manipulated by developers, such as within the environment pane 542 and positioned adjacent or to overlap, like the objects denoted by O1C, O2C, O3C, aspect ratio consistent scaling, stretching, and rotation, respectively, causes each to exhibit discontinuities in texture relative to the other objects. As a result, a developer must tune the texture of each object individually by a variety of variables to minimize such discontinuities. Embodiments described herein provide processes for configuring smart materials, as indicated by 545, which when applied to objects, e.g., O1C, O2C, and O3C, mitigate the illustrated issues, among others, as described and illustrated with reference to the examples described below.

Figure 6A:
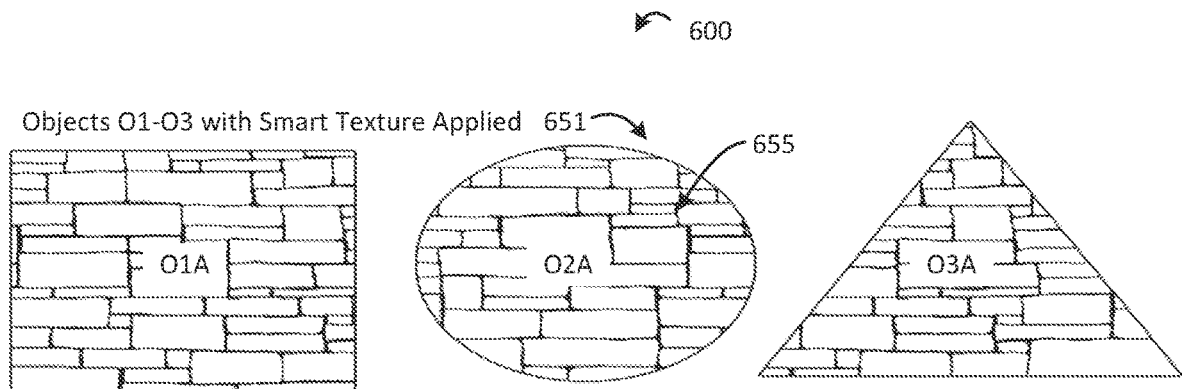
FIG. 6A is a diagram showing an example reaction of a smart material applied to surfaces of objects when those surfaces are manipulated as indicated in some examples.
Figure 6A:
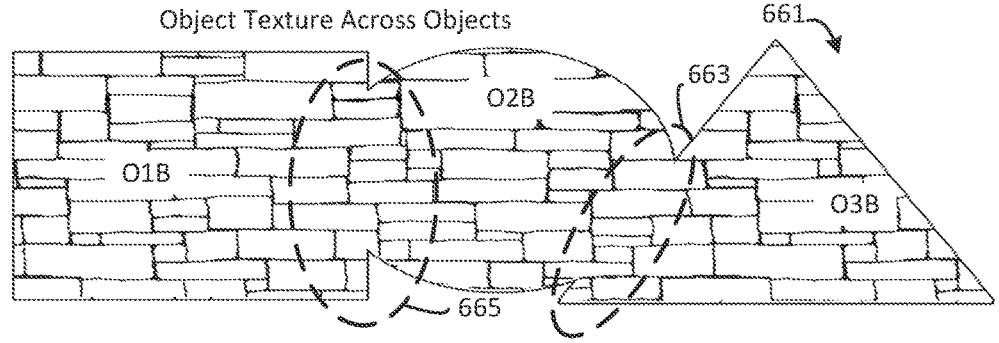
Figure 6A:
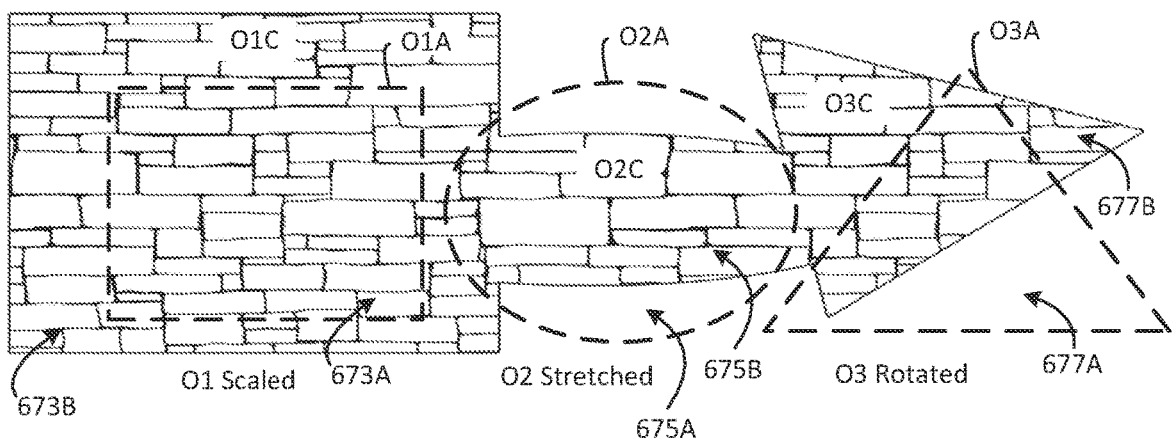

FIG. 6A is a diagram showing an example reaction of a smart material applied to surfaces of objects when those surfaces are manipulated as indicated. For example, various objects O1A, O2A, O3A may have a same smart material 655 applied 651 (e.g., vs a traditionally applied texture). The smart material 655 may be individually selected for or applied in batch to the different objects. The smart material 655 may be tiled from a texture tile in U and V directions within a UV space, and the objects O1A, O2A, O3A positioned such that the illustrated surfaces correspond to a materialled area within the UV space. Thus, for example, the vertices of the different objects are mapped to locations within the UV space of the material corresponding to the plane of the faces. Accordingly, when such objects are repositioned 661, such as to overlap, like the objects denoted by O1B, O2B, O3B, overlap locations 665, 663 between the faces of the objects exhibit no discontinuities by virtue of the mapping between the vertices of the objects within the same UV space of the material. Likewise, when such objects having applied smart materials are manipulated by developers in other ways 671, such as within an environment and positioned adjacent or to overlap, like the objects denoted by O1C, O2C, O3C, object O1C scaling while maintaining aspect ratio from dimensions 673A (e.g., corresponding to object O1A) to dimensions 673B, object O2C stretching without maintaining aspect ratio from dimensions 675A (e.g., corresponding to object O2A) to dimensions 675B, and object O3C rotation from orientation 677A (e.g., corresponding to object O3A) to orientation 677B, as well as positioning does not cause the faces of the object to exhibit discontinuities by virtue of the mapping between the vertices of the objects within the same UV space of the material. Further, smart material scaling may be applied to each object in batch, such as by adjusting a single scaling variable corresponding to the smart material having been applied to each object.

Figure 6B:
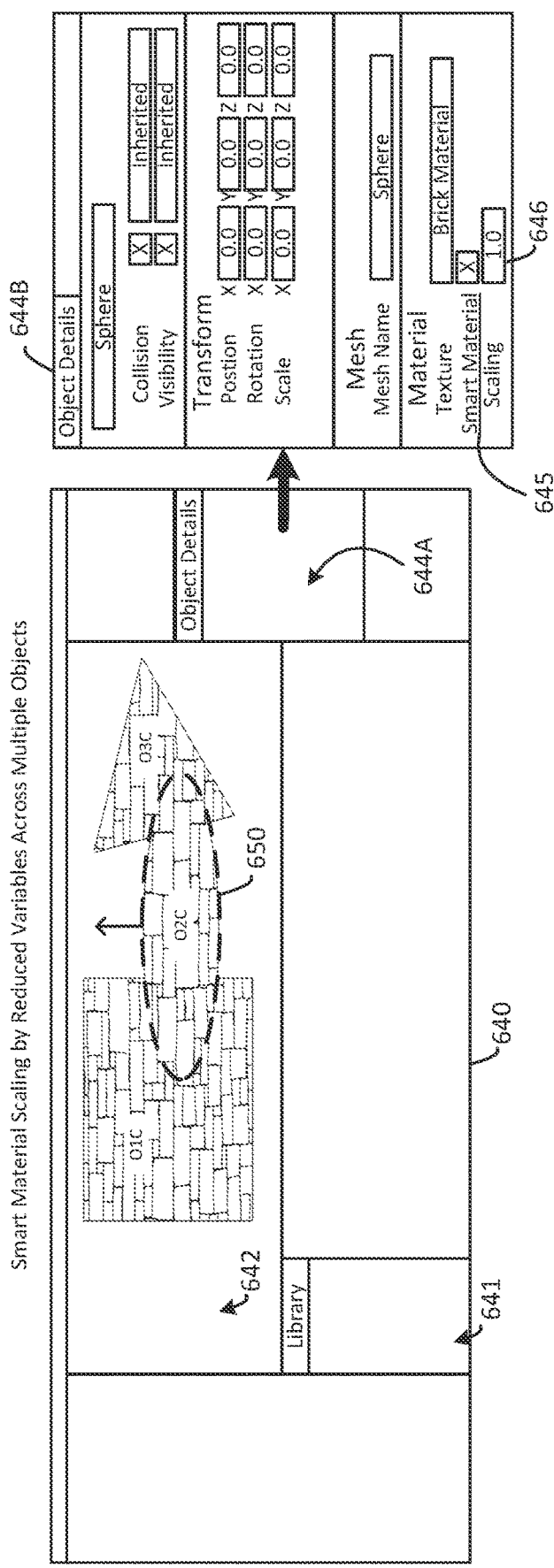
FIG. 6B is a diagram showing an example user interface with a single scale variable for a smart material applied to the surfaces of the objects illustrated in FIG. 6A.

FIG. 6B is a diagram showing an example user interface with a single scale variable for a smart material applied to the surfaces of the objects illustrated in FIG. 6A. As shown, a user interface 640 of an editor may include a variety of different panes. Examples of which may include a library pane 641, which may include lists of assets, like objects, textures, models, etc. available from a models module, which may populate the library with local assets or assets obtained over a network, such as from a repository. The library may include smart materials which may be applied to objects. For example, a models module of an editor may comprise a plurality of pre-populated objects (e.g., polygons and corresponding polygon meshes of a polyhedron correspond to an object, like a block, spherical polyhedron, and the like) and pre-populated textures (along with user defined objects or textures or models) which may be represented within the library pane 641, and various smart textures may be provided for application to objects.

An environment pane 642 may display a rendered environment, which may include one or more assets rendered within environment, or otherwise display a rendering of assets. For example, objects or models as a collection of objects may be rendered within the environment with any applied texture, shading, etc., along with smart materials which may be applied to objects or models. Some embodiments may configure one or more smart materials from existing textures, which may be available from the library pane 642 in accordance with processes described herein. Some embodiments of a library implemented by a models module may link a texture to a smart material instance, or configuration, by which objects may be configured with a smart material instance of the texture. Thus, for example, in some embodiments, an option, such as within an object details pane, may be provided to switch from an applied texture to an instance of a smart material for that texture. A user may utilize the library pane 641 to browse assets, like objects or models, to add to an environment displayed within the environment pane 642, and browse textures or smart materials within the library pane to select for texture those objects (which is not to suggest that a texture or smart material, or switching between a smart material and a texture, cannot be performed within another pane, like one providing details corresponding to an object or model). For example, the user may drag and drop, select to add, or otherwise add a plurality of objects, like O1C, O2C, and O3C, from the library 641 to the environment displayed within the environment pane 642. The user may configure those objects within the environment via the environment pane 642, such as by selecting an object, and modifying properties of the object within the environment, like position, scaling, orientation, etc., and those modifications may be rendered in accordance with the perspective the environment is viewed within the environment pane. FIG. 6B, for example, illustrates the selection 650 of object O2C for manipulation, and object O2C may be rotated, scaled, and positioned as desired by the user within the environment and rendered in accordance to a current view of the environment within the environment pane 642. FIG. 6B also illustrates the application of a smart material (in contrast to the texture of FIG. 5B) to three objects, O1C, O2C, and O3C, such as by selection from the library pane 642 (or alternatively within another pane, like an object details pane), where each object is positioned, scaled, or oriented within an example environment as desired by a user. Details corresponding to assets, like objects, within the environment may be displayed within another pane, like object details pane 644A. A user may interrogate an asset, like an object, such as by selection 650 within the environment pane 642 or object details pane 644A, or drop down menu with the object details pane 644A, to view details, like object details 644B, corresponding to the object.

In the illustrated example, objects O1C, O2C, and O3C are each configured in some way as might be desired by a user when creating an environment. For example, one or more objects may be positioned to overlap as shown, or might be positioned adjacent to each other. They may be scaled as desired, whether uniformly to maintain an aspect ratio, e.g., O1C, or without maintaining an aspect ratio, like in one axis more than another, e.g., O2C, or rotated relative to other objects, e.g., O3C. Example object details 644B are shown in reference to an example selection of object O2C for configuration. The object details pane 644B may indicate information for the selected object, like object properties and smart material properties (e.g., rather than texture U-V tiling scaling properties) and smart material name for the object when a smart material is applied. The object details pane 644B may indicate, as shown, that a smart material 645 is applied to the object. A scaling for the smart material 646 may also be indicated. The scaling may be applied globally for the smart material and correspond to that of an instance of the smart material. The scaling may be adjusted by the (e.g., single) variable for the object (e.g., which may correspond to a new smart material instance if altered) or may modify scaling for the instance of the smart material (e.g., which may be applied to multiple objects as shown). For an applied smart material 645, the scaling property, rather than object aspect ratio consistent scaling, stretching, and rotation may govern rendered texture appearance. Moreover, the scaling need not be tied to each of the objects O1C, O2C, and O3C individually, but rather for the smart material instance, which may remain consistent across the multiple objects. Accordingly, when such objects are manipulated by users, such as within the environment pane 642 and positioned adjacent or to overlap, like the objects denoted by O1C, O2C, O3C, with aspect ratio consistent scaling, stretching, and rotation, respectively, the smart material may be tiled from a texture tile in U and V directions within a UV space consistently across the objects having a same applied smart material instance (e.g., where the scaling of which may be adjusted by an example scaling variable 646 for the instance to batch scale the smart material across the surfaces of multiple objects having the applied smart texture or to configure another instance of a smart material for an object). Here, the surfaces of the objects O1C, O2C, O3C may be mapped to a materialled area (based on the smart material texture and scaling) within the UV space. Thus, for example, the vertices of the different objects are mapped to locations within the UV space of the material corresponding to the plane of the faces. Accordingly, when such objects having applied smart materials are manipulated by a user, such as within an environment and positioned adjacent or to overlap, scaled while maintain aspect ratio or stretched, rotated, or otherwise configured, such manipulations of objects like those denoted by O1C, O2C, O3C, exhibit consistent texturing across their surfaces as a result of the material projection. Specifically, the application of the smart material 645 (e.g., which in some embodiments an instance thereof linked to a base texture may be selected within an object details pane 644B or otherwise configured in accordance with example processes discussed herein) to objects, like the example objects O1C, O2C, O3C, does not cause faces of the objects to exhibit discontinuities by virtue of the mapping between the vertices of the objects within the same UV space of the smart material (e.g., like an instance thereof applied to those objects). Further, smart material scaling may be applied to each object in batch, such as by adjusting a single scaling variable corresponding to the smart material having been applied to each object. As a result, a developer need not tune a texture of each object individually, but rather apply a smart texture to a collection of objects to consistently texture those objects where scaling of the smart material (or instance thereof) may be uniformly adjusted across those objects even when they are manipulated in way which cause discontinuities in traditional texturing process. A smart material 645, like the example brick material illustrated, may be configured and applied to objects within the environment pane 642 in accordance with embodiments of processes provided herein for configuring and applying smart materials to reduce development times of intricate game environments.

Figure 7:
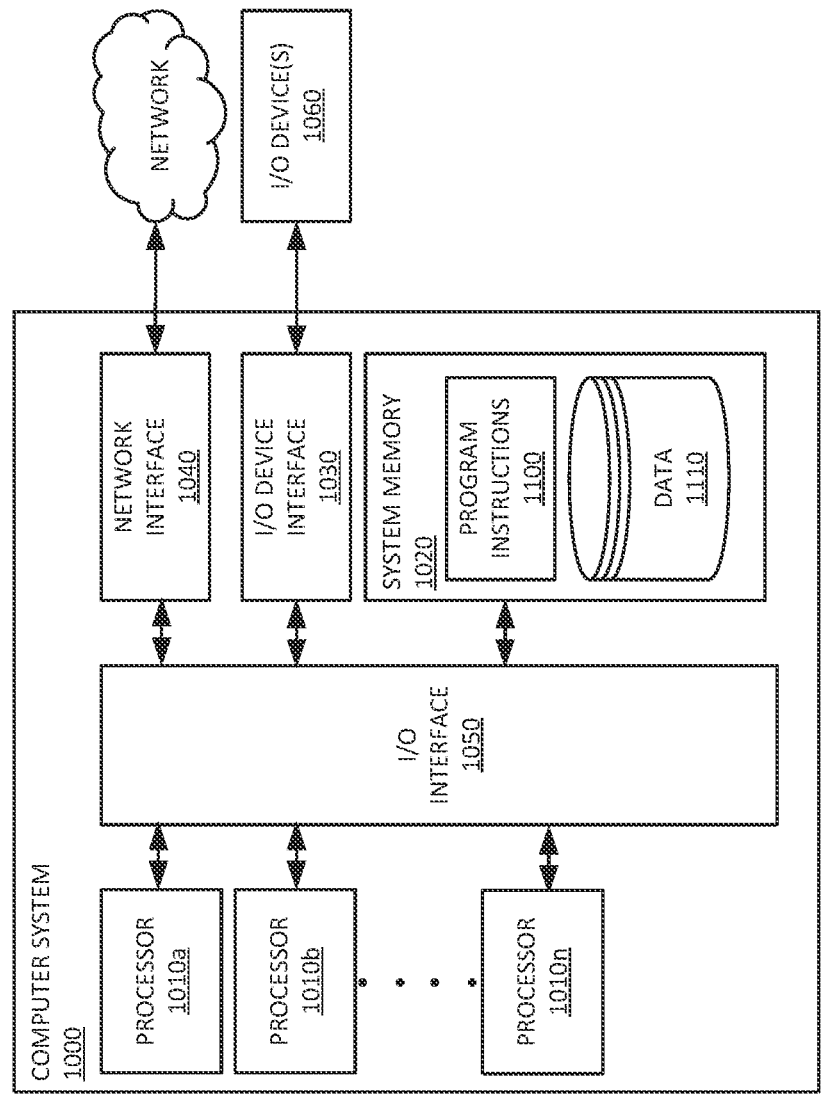
FIG. 7 is a diagram that illustrates an example computing system by which embodiments of the present techniques may be implemented.

FIG. 7 is a diagram that illustrates an example computing system 1000 in accordance with embodiments of the present techniques. Various portions of systems and methods described herein, may include or be executed on one or more computer systems similar to computing system 1000. For example, one or more of illustrated components or devices of FIG. 1, such as 120, 130, 150, 160, and 170, may be, or include, one or more components of example computing system 1000 described below. A computing system like that illustrated in FIG. 7 may, for example, include and execute modules of an editor of a developer application, like those illustrated in FIG. 2. Thus, for example, processes and modules described herein may be executed by one or more processing systems or devices similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

Example embodiments include, but are not limited to:

1. A computer system including one or more processors and a tangible, non-transitory, machine-readable medium, or a tangible, non-transitory, machine-readable medium (e.g., storing instructions that when executed by one or more processors) configured to effectuate or perform operations such as establishing, with a computer system, a three-dimensional (3D) environment space including a reference frame, wherein objects are added to the environment space and rendered based on respective positional information and a viewpoint; establishing, with the computer system, a two-dimensional (2D) material space based on a texture tile of a material, the texture tile replicated in at least one dimension; receiving, with the computer system, a selection to apply the material to an object added to the environment space; obtaining, with the computer system, positional information corresponding to an object; determining, with the computer system, based on the positional information, a mapping of a group of vertices corresponding to a face of the object to the material space, the group of vertices bounding a portion of at least one texture tile as it would appear in the material space; and rendering, with the computer system, the face of the object with the portion of the at least one texture tile, wherein faces of other objects sharing a same normal vector in 3D space with the face of the object are textured based on the at least one texture tile or another texture tile of the material within the material space based on respective mappings of groups of vertices corresponding to the faces.

2. The example operations of embodiment 1 that further comprise receiving, with the computer system, a hold selection; capturing, with the computer system, a smart material mapping from an original UV space associated with a face of an object; rendering, with the computer system, the face of the object with the captured mapping subsequent to detecting new positional information for the object within environment space; receiving, with the computer system, a toggle selection identifying the smart material and the object; in response to the toggle selection, identifying, with the computer system, a new mapping of the group of vertices to the material space, the group of vertices bounding a different portion of the at least one texture tile or a portion of a different texture tile; and rendering, with the computer system, the face of the object with the different portion of the at least one texture tile or the portion of the different texture tile while the toggle selection is active.

3. The example operations of embodiment 1 that further comprise steps for configuring world-space material mapping.

4. The example operations of embodiment 1 wherein the 3D environment is a 3D environment of a game comprising a plurality of 3D models having a pose in a world-space coordinate system; the texture tile is an 2D image; the texture tile has a scale in the world-space coordinate system; and the texture tile is tiled on at least a plurality of polygons of one of the plurality of 3D models.

5. The example operations of embodiment 1 wherein the object is a 3D model upon which portions of a texture tile of the material are tiled; the operations comprise: moving the object and changing a spatial phase of the tiling relative to a coordinate system of the 3D model responsive to the moving; receiving a command to freeze the spatial phase of the tiling; in response to the command, changing a coordinate system by which the tiling is specified from a world-space coordinate system to a coordinate system of the 3D model, wherein the environment space comprises a plurality of 3D models each with different model-specific coordinate systems.

6. The example operations of embodiment 1 wherein the object is a 3D model obtained from a server system hosting a game-development application; the 3D model is associated with the scale; and world-space material mapping of the texture on the 3D model is configured based on the scale during game development using the game-development application.

7. The example operations of embodiment 6 wherein the game-development application is configured to receive a game-developer request to publish a game having the object and, in response, host a playable instance of the game accessible to game players.

8. The example operations of embodiments 7 wherein the published game is an online multiplayer game.

9. The example operations of embodiment 6 wherein the operations comprise receiving, with the server system, a user selection of a material from a plurality of materials displayed in a game-development user interface; and applying the material to the object in a world-space coordinate system based on a known scale of the environment space and the object.

10. The example operations of embodiment 9 wherein the operations comprise moving the object in the environment space and, in response, reconfiguring the texturing; freezing the texturing; and after freezing, moving the object in the environment space without reconfiguring the texturing.

11. An example method, such as a computer implemented method, comprising steps such as establishing, with a computer system, a three-dimensional (3D) environment space including a reference frame, wherein objects are added to the environment space and rendered based on respective positional information and a viewpoint; establishing, with the computer system, a two-dimensional (2D) material space based on a texture tile of a material, the texture tile replicated in at least one dimension; receiving, with the computer system, a selection to apply the material to an object added to the environment space; obtaining, with the computer system, positional information corresponding to an object; determining, with the computer system, based on the positional information, a mapping of a group of vertices corresponding to a face of the object to the material space, the group of vertices bounding a portion of at least one texture tile; and rendering, with the computer system, the face of the object with the portion of the at least one texture tile, wherein faces of other objects sharing a same normal vector in 3D space with the face of the object are materialled based on determined positions of the at least one texture tile or another texture tile within the material space based on respective mappings of groups of vertices corresponding to the faces.

12. The example method of embodiment 11 wherein the operations further comprise receiving, with the computer system, a hold selection; capturing, with the computer system, a smart material mapping from an original UV space associated with a face of an object; rendering, with the computer system, the face of the object with the captured mapping subsequent to detecting new positional information for the object within environment space; receiving, with the computer system, a toggle selection identifying the smart material and the object; in response to the toggle selection, identifying, with the computer system, a new mapping of the group of vertices to the material space, the group of vertices bounding a different portion of the at least one texture tile or a portion of a different texture tile; and rendering, with the computer system, the face of the object with the different portion of the at least one texture tile or the portion of the different texture tile while the toggle selection is active.

13. The example method of embodiment 11 wherein the operations further comprise steps for configuring world-space material mapping.

14. The example method of embodiment 11 wherein the 3D environment is a 3D environment of a game comprising a plurality of 3D models having a pose in a world-space coordinate system; the texture tile is an 2D image; the texture tile has a scale in the world-space coordinate system; and the texture tile is tiled on at least a plurality of polygons of one of the plurality of 3D models.

15. The example method of embodiment 11 wherein the object is a 3D model upon which portions of a texture tile of the material are tiled; the operations comprise: moving the object and changing a spatial phase of the tiling relative to a coordinate system of the 3D model responsive to the moving; receiving a command to freeze the spatial phase of the tiling; in response to the command, changing a coordinate system by which the tiling is specified from a world-space coordinate system to a coordinate system of the 3D model, wherein the environment space comprises a plurality of 3D models each with different model-specific coordinate systems.

16. The example method of embodiment 11 wherein the object is a 3D model obtained from a server system hosting a game-development application; the 3D model is associated with the scale; and world-space material mapping of the material on the 3D model is configured based on the scale during game development using the game-development application.

17. The example method of embodiment 16 wherein the game-development application is configured to receive a game-developer request to publish a game having the object and, in response, host a playable instance of the game accessible to game players.

18. The example method of embodiment 17 wherein the published game is an online multiplayer game.

19. The example method of embodiment 16 that further comprise receiving, with the server system, a user selection of a material from a plurality of materials displayed in a game-development user interface; and applying the material to the object in a world-space coordinate system based on a known scale of the environment space and the object.

20. The example method of embodiment 19 that further comprise moving the object in the environment space and, in response, reconfiguring the texturing; freezing the texturing; and after freezing, moving the object in the environment space without reconfiguring the texturing.

What is claimed is:

1. A method of designing a virtual world, the method comprising:
    obtaining, with a computer system, a three-dimensional virtual world, the virtual world having a world-space coordinate system;
    obtaining, with the computer system, a three-dimensional model for use in the virtual world, the model comprising:
        a mesh having three-dimensional vertices specifying polygons that define a shape of the model; and
        a material to be mapped to a selection of one or more of the polygons, the mapping being based on position of the model in the world-space coordinate system, wherein moving the model in the world-space coordinate system causes the mapping of the material to at least one of the selected polygons to move as well; and
        a scale of the model within the world-space coordinate system;
    receiving, with the computer system, from a designer creating a game in the virtual world, a placement of the model in the virtual world;
    receiving, with the computer system, from the designer, adjustment of the scale of the model in the world-space coordinate system to configure the model;
    determining, with the computer system, in response to the adjustment of the scale of the model, whether material scaling is locked or unlocked to the model, and, in response to determining that the material scaling is locked to the model, adjusting the scale of the material in the world-space coordinate system based on the adjustment to the scale of the model to relatively resize the material to the model; and
    causing, with the computer system, the model to be rendered in the virtual world with the material mapped on the model based on position of the model in the world-space coordinate system and the material sized in the world-space coordinate system according to the adjustment.

2. The method of claim 1, comprising:
    moving the model in the world-space coordinate system to cause the mapping of the material to at least one of the selected polygons to move;
    receiving an input from the designer to freeze, for the one or more of the selected polygons, the material position relative to the model without freezing scaling; and
    moving the model in the world-space coordinate system after the freezing and, in response to the freezing, maintaining the frozen material position on the one or more of the selected polygons of the model while the model moves.

3. The method of claim 2, wherein, before freezing, the model is positioned in the world-space coordinate system relative to another model on to which the material is also mapped.

4. The method of claim 1, comprising:
    publishing the virtual world with the model configured; and
    providing the virtual world with the model configured to a plurality of users who interact with the configured model.

5. The method of claim 1, wherein:
    the three-dimensional model is part of an inventory of assets in an online amateur game development tool and receiving the placement of the model is performed with an editor of the game development tool, and wherein the material is one of a plurality of candidate materials selected among by the designer for the model.

6. The method of claim 1, comprising:
steps for publishing a game utilizing the model.

7. The method of claim 1, comprising:
steps for manipulating material properties of the material.

8. The method of claim 1, comprising:
steps for defining the material.

9. The method of claim 1, wherein the material is a smart material.

10. The method of claim 1, wherein the scale of the material relative to the model is not adjustable by the designer.

11. A tangible, non-transitory, machine-readable medium storing instructions that when executed by one or more processors effectuate operations comprising:
- obtaining, with a computer system, a three-dimensional virtual world, the virtual world having a world-space coordinate system;
- obtaining, with the computer system, a three-dimensional model for use in the virtual world, the model comprising:
  - a mesh having three-dimensional vertices specifying polygons that define a shape of the model; and
  - a material to be mapped to a selection of one or more of the polygons, the mapping being based on position of the model in the world-space coordinate system, wherein moving the model in the world-space coordinate system causes the mapping of the material to at least one of the selected polygons to move as well; and
  - a scale of the model within the world-space coordinate system;
- receiving, with the computer system, from a designer creating a game in the virtual world, a placement of the model in the virtual world;
- receiving, with the computer system, from the designer, adjustment of the scale of the model in the world-space coordinate system to configure the model;
- determining, with the computer system, in response to the adjustment of the scale of the model, whether material scaling is locked or unlocked to the model, and, in response, to determining that the material scaling is locked to the model, adjusting the scale of the material in the world-space coordinate system based on the adjustment to the scale of the model to relatively resize the material to the model; and
- causing, with the computer system, the model to be rendered in the virtual world with the material mapped on the model based on position of the model in the world-space coordinate system and the material sized in the world-space coordinate system according to the adjustment.

12. The medium of claim 11, the operations further comprising:
- moving the model in the world-space coordinate system to cause the mapping of the material to at least one of the selected polygons to move;
- receiving an input from the designer to freeze, for the one or more of the selected polygons, the material position relative to the model without freezing scaling; and
- moving the model in the world-space coordinate system after the freezing and, in response to the freezing, maintaining the frozen material position on the one or more of the selected polygons of the model while the model moves.

13. The medium of claim 12 wherein, before freezing, the model is positioned in the world-space coordinate system relative to another model on to which the material is also mapped.

14. The medium of claim 11, the operations further comprising:
- publishing the virtual world with the model configured; and
- providing the virtual world with the model configured to a plurality of users who interact with the configured model.

15. The medium of claim 11, wherein:
- the three-dimensional model is part of an inventory of assets in an online amateur game development tool and receiving the placement of the model is performed with an editor of the game development tool, and wherein the material is one of a plurality of candidate materials selected among by the designer for the model.

16. The medium of claim 11, the operations further comprising:
- steps for publishing a game utilizing the model.

17. The medium of claim 11, the operations further comprising:
- steps for manipulating material properties of the material.

18. The medium of claim 11, the operations further comprising:
- steps for defining the material.

19. The medium of claim 11, wherein the material is a smart material.

20. The medium of claim 11, wherein the scale of the material relative to the model is not adjustable by the designer.

* * * * *